US012623382B2

(12) United States Patent
Mizunashi et al.

(10) Patent No.: US 12,623,382 B2
(45) Date of Patent: May 12, 2026

(54) CONTROL DEVICE OF INJECTION MOLDING MACHINE, INJECTION MOLDING MACHINE, AND RECORDING MEDIUM

(71) Applicant: SUMITOMO HEAVY INDUSTRIES, LTD., Tokyo (JP)

(72) Inventors: Takuya Mizunashi, Chiba (JP); Takasue Yamaguchi, Chiba (JP); Daigo Hotta, Chiba (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/817,411

(22) Filed: Aug. 4, 2022

(65) Prior Publication Data

US 2023/0051979 A1     Feb. 16, 2023

(30) Foreign Application Priority Data

Aug. 11, 2021 (JP) ................................. 2021-131361

(51) Int. Cl.
*B29C 45/17* (2006.01)
*B29C 45/76* (2006.01)

(52) U.S. Cl.
CPC .......... *B29C 45/1774* (2013.01); *B29C 45/76* (2013.01); *B29C 2045/7606* (2013.01)

(58) Field of Classification Search
CPC ................. B29C 45/1774; B29C 45/76; B29C 2045/7606
See application file for complete search history.

(56) References Cited

U.S. PATENT DOCUMENTS

| | | | |
|---|---|---|---|
| 5,173,223 A | 12/1992 | Kamiguchi et al. | |
| 2003/0082255 A1* | 5/2003 | Konishi ................. | B29C 45/76 |
| | | | 425/173 |
| 2004/0051194 A1 | 3/2004 | Yamazaki et al. | |

FOREIGN PATENT DOCUMENTS

| | | |
|---|---|---|
| JP | S59-217119 | 12/1984 |
| JP | H03-155915 | 7/1991 |
| JP | H06-297532 | 10/1994 |
| JP | H07-205246 | 8/1995 |
| JP | H11-309767 | 11/1999 |
| JP | 2001-287254 | 10/2001 |

(Continued)

*Primary Examiner* — Alison L Hindenlang
*Assistant Examiner* — Shibin Liang
(74) *Attorney, Agent, or Firm* — IPUSA, PLLC

(57) ABSTRACT

A control device of an injection molding machine includes an output part configured to output a display screen displaying waveform information indicating a change of at least one of setting information indicating a setting of a process of injection molding or an actual value according to the process, and a plurality of pieces of instruction information to set a range of the waveform information, the display screen being output to a display input device in which a display device and an input device are integrated, the display input device being configured to receive an operation in a screen area displayed by the display input device, the display input device being connected to the injection molding machine; and a receiving part configured to receive, from the display input device, an operation with respect to at least one of the plurality of pieces of instruction information displayed on the display screen.

10 Claims, 8 Drawing Sheets

(56) References Cited

FOREIGN PATENT DOCUMENTS

| JP | 2003-200456 | 7/2003 |
| JP | 2004-106272 | 4/2004 |
| JP | 2004-155065 | 6/2004 |
| JP | 2005-028894 | 2/2005 |
| JP | 2006-341501 | 12/2006 |
| JP | 2007-196604 | 8/2007 |
| JP | 2009-000929 | 1/2009 |

* cited by examiner

CONTROL DEVICE OF INJECTION MOLDING MACHINE, INJECTION MOLDING MACHINE, AND RECORDING MEDIUM

CROSS-REFERENCE TO RELATED APPLICATION

The present application is based on and claims priority under 35 U.S.C. § 119 to Japanese Patent Application No. 2021-131361, filed on Aug. 11, 2021, the contents of which are incorporated herein by reference in their entirety.

BACKGROUND

1. Technical Field

The present invention relates to a control device of an injection molding machine, an injection molding machine, and a recording medium.

2. Description of the Related Art

Various sensors have conventionally been installed in injection molding machines. Thus, in injection molding machines, a technology has been proposed to display, on a display device, waveform data representing, by waveforms, various processes during injection molding based on detection signals from sensors, or setting contents set by a user.

In recent years, various techniques have been proposed to display waveform data on the display device of injection molding machines. For example, in the conventional technology, a technology to display information such as a mold closing position, in association with a variation curve of physical quantity, has been proposed.

In recent years, a display input device, in which an operation device such as a touch panel and a display device are integrated, tends to be used as an interface for receiving an operation from a user. In such a display input device, the operation device and the display device are integrated, and, therefore, an operation can be performed while confirming the displayed contents.

SUMMARY

According to an embodiment of the present invention, there is provided a control device of an injection molding machine, the control device including an output part configured to output a display screen displaying waveform information indicating a change of at least one of setting information indicating a setting of a process of injection molding or an actual value according to the process, and a plurality of pieces of instruction information to set a range of the waveform information, the display screen being output to a display input device in which a display device and an input device are integrated, the display input device being configured to receive an operation in a screen area displayed by the display input device, the display input device being connected to the injection molding machine; and a receiving part configured to receive, from the display input device, an operation with respect to at least one of the plurality of pieces of instruction information displayed on the display screen.

DETAILED DESCRIPTION

A conventional technology does not use a display input device such as a touch panel, but is simply a technology for appropriately recognizing a reference value by pointing a cursor at a variation curve; the conventional technology is not a technology for reducing the operational load. That is, in the conventional technology, because it is difficult to specify a range or the like with respect to the waveform data, it is difficult to specifically identify the situation represented by the waveform data.

One aspect of the present invention provides a technology that can implement detailed quality control, because by specifying a range of waveform information by way of a display input device, it becomes possible to appropriately identify the situation indicated in the range.

Embodiments of the present invention will be described below with reference to the drawings. Identical or corresponding configurations in each drawing may be given the same or corresponding symbols and explanations thereof may be omitted.

Figure 1:
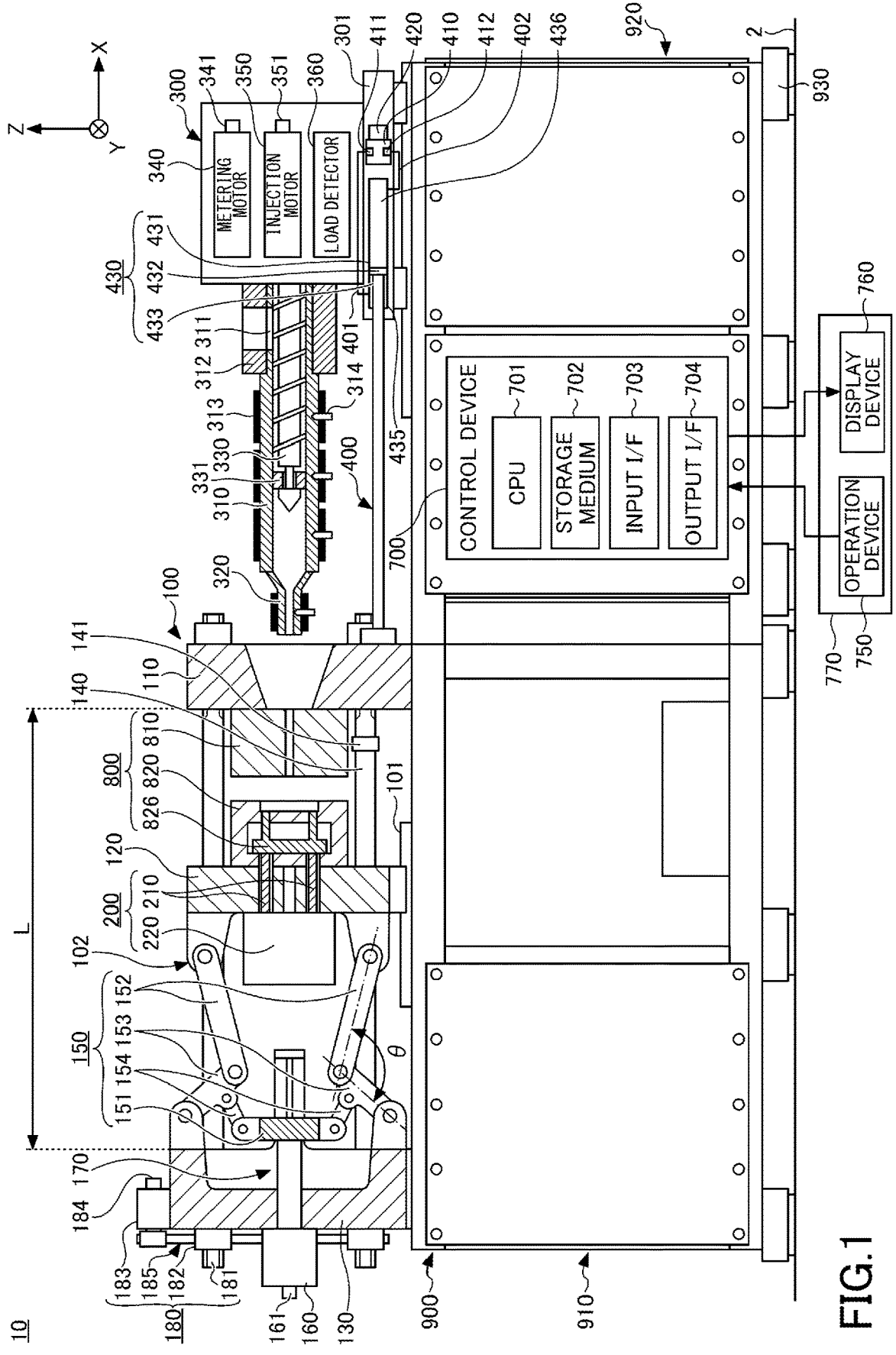
FIG. 1 illustrates the state of an injection molding machine according to the first embodiment at the time of mold opening completion.
Figure 2:
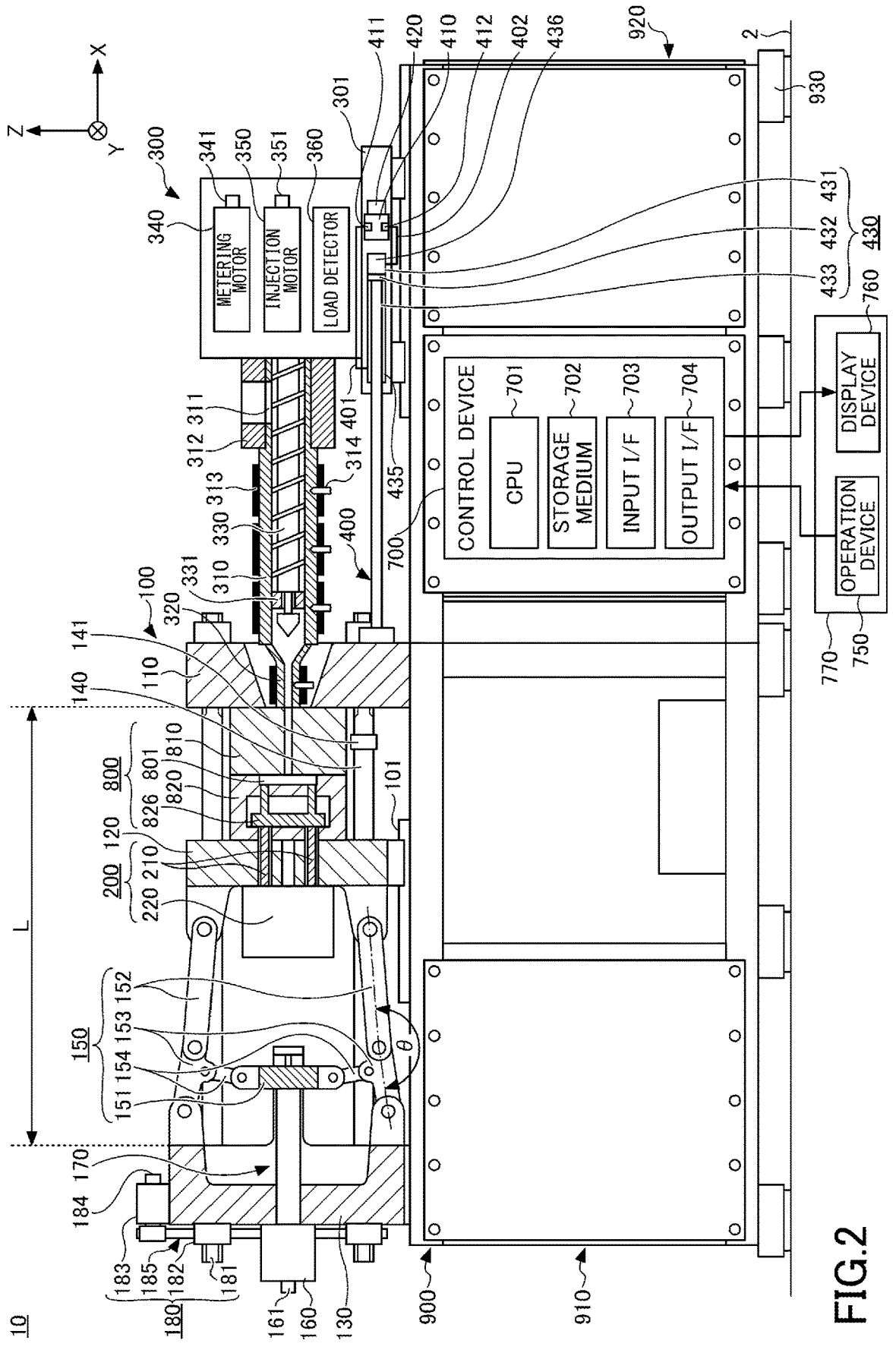
FIG. 2 illustrates the state of the injection molding machine according to the first embodiment at the time of mold clamping.

FIG. 1 illustrates the state of the injection molding machine according to the first embodiment at the time of mold opening completion. FIG. 2 is a diagram illustrating the state of the injection molding machine according to the first embodiment at the time of mold clamping. In the present specification, the X-axis, Y-axis and Z-axis directions are perpendicular to each other. The X-axis direction and the Y-axis direction represent the horizontal direction, and the Z-axis direction represents the vertical direction. When a mold clamping unit 100 is horizontal, the X-axis direction is the mold opening and closing direction and the Y-axis direction is the width direction of an injection molding machine 10. The negative side in the Y-axis direction is referred to as "the operation side", and the positive side in the Y-axis direction is referred to as "the non-operation side".

As illustrated in FIGS. 1 and 2, the injection molding machine 10 includes the mold clamping unit 100 that opens and closes a mold unit 800, an ejector unit 200 that ejects the molding product formed by the mold unit 800, an injection unit 300 that injects the molding material into the mold unit 800, a moving unit 400 that moves the injection unit 300 forward and backward with respect to the mold unit 800, a control device 700 that controls each element of the injection molding machine 10, and a frame 900 that supports each element of the injection molding machine 10. The frame 900 includes a mold clamping unit frame 910 supporting the mold clamping unit 100 and an injection unit frame 920 supporting the injection unit 300. The mold clamping unit frame 910 and the injection unit frame 920 are respectively installed on a floor 2 via a leveling adjuster 930. The control device 700 is arranged in the internal space of the injection unit frame 920. Each element of the injection molding machine 10 is described below.

(Mold Clamping Unit)

In the explanation of the mold clamping unit 100, the moving direction of a movable platen 120 when the mold is closed (for example, the positive X-axis direction) is described as forward, and the moving direction of the movable platen 120 when the mold is opened (for example, the negative X-axis direction) is described as backward.

The mold clamping unit 100 closes, pressurizes (boosts the pressure), clamps, depressurizes, and opens the mold unit 800. The mold unit 800 includes a stationary mold 810 and a movable mold 820. The mold clamping unit 100 is a horizontal type, for example, and the mold opening and closing direction is the horizontal direction. The mold clamping unit 100 has a stationary platen 110 to which the stationary mold 810 is attached, the movable platen 120 to which the movable mold 820 is attached, and a moving mechanism 102 for moving the movable platen 120 in the mold opening and closing direction with respect to the stationary platen 110.

The stationary platen 110 is fixed to the mold clamping unit frame 910. The stationary mold 810 is attached to the surface of the stationary platen 110 facing the movable platen 120.

The movable platen 120 is arranged so as to be movable in the mold opening and closing direction with respect to the mold clamping unit frame 910. On the mold clamping unit frame 910, a guide 101 is laid to guide the movable platen 120. The movable mold 820 is attached to the surface of the movable platen 120 facing the stationary platen 110.

The moving mechanism 102 moves the movable platen 120 forward and backward with respect to the stationary platen 110 to close, pressurize (boost the pressure), clamp, depressurize, and open the mold unit 800. The moving mechanism 102 includes a toggle support 130 spaced apart from the stationary platen 110, a tie bar 140 connecting the stationary platen 110 and the toggle support 130, a toggle mechanism 150 that moves the movable platen 120 in the mold opening and closing direction with respect to the toggle support 130, a mold clamping motor 160 that causes the toggle mechanism 150 to operate, a motion conversion mechanism 170 that converts the rotational motion of the mold clamping motor 160 into a linear motion, and a mold space adjustment mechanism 180 that adjusts the interval between the stationary platen 110 and the toggle support 130.

The toggle support 130 is spaced apart from the stationary platen 110 and is mounted on the mold clamping unit frame 910 so as to be movable in the mold opening and closing direction. Note that the toggle support 130 may be arranged so as to be movable along a guide laid on the mold clamping unit frame 910. The guide of the toggle support 130 may be the same as the guide 101 of the movable platen 120.

In the present embodiment, the stationary platen 110 is fixed to the mold clamping unit frame 910 and the toggle support 130 is arranged with respect to the mold clamping unit frame 910 so as to be movable in the mold opening and closing direction, but the toggle support 130 may be fixed to the mold clamping unit frame 910 and the stationary platen

110 may be arranged with respect to the mold clamping unit frame 910 so as to be movable in the mold opening and closing direction.

The tie bar 140 connects the stationary platen 110 and the toggle support 130 with an interval L in the mold opening and closing direction. Multiple tie bars 140 (e.g., 4) may be used. The multiple tie bars 140 are arranged parallel to the mold opening and closing direction and extend according to the mold clamping force. At least one tie bar 140 may be provided with a tie bar distortion detector 141 that detects the distortion of the tie bar 140. The tie bar distortion detector 141 sends a signal indicating the detection result thereof to the control device 700. The detection result of the tie bar distortion detector 141 is used for the detection of the mold clamping force, etc.

Although the tie bar distortion detector 141 is used as the mold clamping force detector for detecting the mold clamping force in the present embodiment, the present invention is not limited thereto. The mold clamping force detector is not limited to a distortion gauge type, but may be a piezo-electric type, a capacitive type, a hydraulic type, an electromagnetic type, etc., and the attachment position thereof is not limited to the tie bar 140.

The toggle mechanism 150 is arranged between the movable platen 120 and the toggle support 130 to move the movable platen 120 with respect to the toggle support 130 in the mold opening and closing direction. The toggle mechanism 150 includes a crosshead 151 that moves in the mold opening and closing direction and a pair of link groups that bend and stretch by the movement of the crosshead 151. The pair of link groups includes a first link 152 and a second link 153, which are flexibly connected by a pin or the like. The first link 152 is swingably attached to the movable platen 120 by a pin or the like. The second link 153 is swingably attached to the toggle support 130 by a pin or the like. The second link 153 is attached to the crosshead 151 via a third link 154. When the crosshead 151 is moved forward and backward with respect to the toggle support 130, the first link 152 and the second link 153 are extended and retracted, and the movable platen 120 moves forward and backward with respect to the toggle support 130.

The configuration of the toggle mechanism 150 is not limited to the configuration illustrated in FIGS. 1 and 2. For example, in FIGS. 1 and 2, the number of nodes in each link group is 5, but the number of nodes may be 4, and one end of the third link 154 may be connected to the node between the first link 152 and the second link 153.

The mold clamping motor 160 is attached to the toggle support 130 to cause the toggle mechanism 150 to operate. The mold clamping motor 160 extends and retracts the first link 152 and the second link 153 by moving the crosshead 151 forward and backward with respect to the toggle support 130, and moves the movable platen 120 forward and backward with respect to the toggle support 130. The mold clamping motor 160 is directly connected to the motion conversion mechanism 170, but may be connected to the motion conversion mechanism 170 via a belt, a pulley, etc.

The motion conversion mechanism 170 converts the rotational motion of the mold clamping motor 160 into a linear motion of the crosshead 151. The motion conversion mechanism 170 includes a screw shaft and a screw nut that screws into the screw shaft. A ball or a roller may be interposed between the screw shaft and the screw nut.

The mold clamping unit 100 performs a mold closing process, a pressure-boosting process, a mold clamping process, a pressure-releasing process, and a mold opening process under the control of the control device 700.

In the mold closing process, the mold clamping motor 160 is driven to advance the crosshead 151 to the mold closing completion position at a set moving speed, thereby advancing the movable platen 120 and causing the movable mold 820 to touch the stationary mold 810. The position and moving speed of the crosshead 151 are detected by using, for example, a mold clamping motor encoder 161. The mold clamping motor encoder 161 detects the rotation of the mold clamping motor 160 and sends a signal indicating the result of the detection to the control device 700.

The crosshead position detector for detecting the position of the crosshead 151 and the crosshead moving speed detector for detecting the moving speed of the crosshead 151 are not limited to the mold clamping motor encoder 161, but general detectors may be used. The movable platen position detector for detecting the position of the movable platen 120 and the movable platen moving speed detector for detecting the moving speed of the movable platen 120 are not limited to the mold clamping motor encoder 161, and general detectors may be used.

In the pressure-boosting process, the mold clamping force is generated by further driving the mold clamping motor 160 to further advance the crosshead 151 from the mold closing position to the mold clamping position.

In the mold clamping process, the mold clamping motor 160 is driven to maintain the position of the crosshead 151 at the mold clamping position. In the mold clamping process, the mold clamping force generated in the pressure-boosting process is maintained. In the mold clamping process, a cavity space 801 (see FIG. 2) is formed between the movable mold 820 and the stationary mold 810, and the injection unit 300 fills the cavity space 801 with a liquid molding material. The inserted molding material is solidified, resulting in a molding product.

The number of cavity spaces 801 may be one or more. In the latter case, several molding products are obtained simultaneously. An insert material may be placed in one part of the cavity space 801 and the other part of the cavity space 801 may be filled with a molding material. A molding product that integrates the insert material and the molding material may be obtained.

In the pressure-releasing process, the mold clamping motor 160 is driven to retract the crosshead 151 from the mold clamping position to the mold opening start position, thereby retracting the movable platen 120 and reducing the mold clamping force. The mold opening start position and the mold closing completion position may be the same position.

In the mold opening process, the mold clamping motor 160 is driven to retract the crosshead 151 from the mold opening start position to the mold opening completion position at a set moving speed, thus retracting the movable platen 120 and separating the movable mold 820 from the stationary mold 810. Subsequently, the ejector unit 200 ejects the molding product from the movable mold 820.

The setting conditions in the mold closing process, the pressure-boosting process, and the mold clamping process are collectively set as a series of setting conditions. For example, the moving speed and position (including the mold closing start position, the moving speed switching position, the mold closing completion position, and the mold clamping position) of the crosshead 151 and the mold clamping force in the mold closing process and the pressure-boosting process, are collectively set as a series of setting conditions. The mold closing start position, the moving speed switching position, the mold closing completion position, and the mold clamping position are arranged in the stated order from the back side toward the front side and represent the start point and the end point of the section where the moving speed is set. For each section, a moving speed is set. The moving speed switching position may be one or more. The moving speed switching position need not be set. Only one of either the mold clamping position or the mold clamping force may be set.

Setting conditions in the pressure-releasing process and the mold opening process are similarly set. For example, the moving speed and the position (the mold opening start position, the moving speed switching position, and the mold opening completion position) of the crosshead 151 in the pressure-releasing process and the mold opening process are collectively set as a series of setting conditions. The mold opening start position, the moving speed switching position, and the mold opening completion position are arranged in the stated order from the front side toward the back side and represent the start point and the end point of the section where the moving speed is set. For each section, a moving speed is set. The moving speed switching position may be one or more. The moving speed switching position need not be set. The mold opening start position and the mold closing completion position may be the same position. The mold opening completion position and the mold closing start position may be the same.

Instead of the moving speed and position of the crosshead 151, the moving speed and position of the movable platen 120 may be set. Instead of the position of the crosshead (e.g., mold clamping position) or the position of the movable platen, the mold clamping force may be set.

Incidentally, the toggle mechanism 150 amplifies the driving force of the mold clamping motor 160 and transmits the driving force to the movable platen 120. The amplification factor thereof is also referred to as "the toggle factor". The toggle factor varies according to the angle θ (hereinafter also referred to as a "link angle θ") formed by the first link 152 and the second link 153. The link angle θ is obtained from the position of the crosshead 151. When the link angle θ is 180 degrees, the toggle factor is at the maximum.

When the thickness of the mold unit 800 changes due to the replacement of the mold unit 800 or a change in the temperature of the mold unit 800, the mold space is adjusted so that a predetermined mold clamping force is obtained at the time of mold clamping. In the mold space adjustment, the interval L between the stationary platen 110 and the toggle support 130 is adjusted so that the link angle θ of the toggle mechanism 150 becomes a predetermined angle, for example, at the time of mold touch when the movable mold 820 touches the stationary mold 810.

The mold clamping unit 100 includes a mold space adjustment mechanism 180. The mold space adjustment mechanism 180 adjusts the interval L between the stationary platen 110 and the toggle support 130 to adjust the mold space. The timing when the mold space adjustment is performed is, for example, between the end of a molding cycle and the start of the next molding cycle. The mold space adjustment mechanism 180 includes, for example, a screw shaft 181 formed at the rear end of the tie bar 140, a screw nut 182 held rotatably but not movable back and forth by the toggle support 130, and a mold space adjustment motor 183 for rotating the screw nut 182 screwed to the screw shaft 181.

The screw shaft 181 and the screw nut 182 are provided for each tie bar 140. The rotational driving force of the mold space adjustment motor 183 may be transmitted to multiple screw nuts 182 via a rotational driving force transmitting unit 185. Multiple screw nuts 182 can be rotated synchronously. By changing the transmission path of the rotational driving force transmitting unit 185, it is also possible to rotate each of the multiple screw nuts 182 individually.

The rotational driving force transmitting unit 185 is configured by, for example, gears. In this case, a driven gear is formed on the outer circumference of each screw nut 182, a driving gear is attached to the output shaft of the mold space adjustment motor 183, and a plurality of driven gears and an intermediate gear meshing with a driving gear are held rotatably at the center of the toggle support 130. The rotational driving force transmitting unit 185 may be configured by a belt, a pulley or the like instead of a gear.

The operation of the mold space adjustment mechanism 180 is controlled by the control device 700. The control device 700 drives the mold space adjustment motor 183 to rotate the screw nut 182. As a result, the position of the toggle support 130 with respect to the tie bar 140 is adjusted and the interval L between the stationary platen 110 and the toggle support 130 is adjusted. Multiple mold space adjustment mechanisms may be used in combination.

The interval L is detected by using a mold space adjustment motor encoder 184. The mold space adjustment motor encoder 184 detects the rotation amount and the rotation direction of the mold space adjustment motor 183 and sends a signal indicating the result of the detection to the control device 700. The detection result of the mold space adjustment motor encoder 184 is used to monitor and control the position and the interval L of the toggle support 130. Note that the toggle support position detector for detecting the position of the toggle support 130 and the interval detector for detecting the interval L are not limited to the mold space adjustment motor encoder 184 and general detectors can be used.

The mold clamping unit 100 may have a mold temperature controller to adjust the temperature of the mold unit 800. Inside the mold unit 800, there is a flow path for a temperature control medium. The mold temperature controller adjusts the temperature of the mold unit 800 by adjusting the temperature of a temperature control medium supplied to the flow path of the mold unit 800.

The mold clamping unit 100 of the present embodiment is a horizontal type with the mold opening and closing direction in the horizontal direction, but the mold clamping unit 100 may be a vertical type with the mold opening and closing direction in the vertical direction.

The mold clamping unit 100 of the present embodiment has the mold clamping motor 160 as a driving source, but the mold clamping unit 100 may have a hydraulic cylinder instead of the mold clamping motor 160. The mold clamping unit 100 may include a linear motor for mold opening and closing and an electromagnet for mold clamping.

(Ejector Unit)

In the description of the ejector unit 200, as in the description of the mold clamping unit 100, the moving direction of the movable platen 120 when the mold is closed (for example, the positive X-axis direction) is described as forward, and the moving direction of the movable platen 120 when the mold is opened (for example, the negative X-axis direction) is described as backward.

The ejector unit 200 is attached to the movable platen 120 and moves back and forth together with the movable platen 120. The ejector unit 200 has an ejector rod 210 that ejects the molding product from the mold unit 800 and a driving mechanism 220 that moves the ejector rod 210 in the moving direction (X-axis direction) of the movable platen 120.

The ejector rod 210 is arranged so as to be movable back and forth in a through hole of the movable platen 120. The front end of the ejector rod 210 contacts an ejector plate 826 of the movable mold 820. The front end of the ejector rod 210 may or may not be connected to the ejector plate 826.

The driving mechanism 220 includes, for example, an ejector motor and a motion conversion mechanism that converts the rotational motion of the ejector motor into the linear motion of the ejector rod 210. The motion conversion mechanism includes a screw shaft and a screw nut that screws into the screw shaft. A ball or roller may be interposed between the screw shaft and the screw nut.

The ejector unit 200 performs the ejection process under the control of the control device 700. In the ejection process, the ejector rod 210 is advanced from the standby position to the ejection position at a set moving speed, to advance the ejector plate 826, and eject the molding product. Subsequently, the ejector motor is driven to retract the ejector rod 210 at a set moving speed and the ejector plate 826 is retracted to the original standby position.

The position and the moving speed of the ejector rod 210 are detected by using, for example, an ejector motor encoder. The ejector motor encoder detects the rotation of the ejector motor and sends a signal indicating the result of the detection to the control device 700. The ejector rod position detector for detecting the position of the ejector rod 210 and the ejector rod moving speed detector for detecting the moving speed of the ejector rod 210 are not limited to an ejector motor encoder, but general detectors can be used.

(Injection Unit)

In the description of the injection unit 300, unlike the description of the mold clamping unit 100 and the description of the ejector unit 200, the moving direction of a screw 330 during filling (for example, the negative X-axis direction) is described as forward and the moving direction of the screw 330 during metering (for example, the positive X-axis direction) is described as backward.

The injection unit 300 is installed on a slide base 301, and the slide base 301 is arranged so as to be movable back and forth with respect to the injection unit frame 920. The injection unit 300 is arranged so as to be movable back and forth with respect to the mold unit 800. The injection unit 300 touches the mold unit 800 and fills the cavity space 801 in the mold unit 800 with the molding material metered in a cylinder 310. The injection unit 300 includes, for example, the cylinder 310 that heats the molding material, a nozzle 320 provided at the front end of the cylinder 310, the screw 330 that is arranged in the cylinder 310 so as to be movable back and forth and rotatable, a metering motor 340 that rotates the screw 330, an injection motor 350 that moves the screw 330 forward and backward, and a load detector 360 that detects the load transmitted between the injection motor 350 and the screw 330.

The cylinder 310 heats the molding material supplied inside from a feed port 311. The molding material includes, for example, resin. The molding material is formed, for example, in the form of a pellet and is supplied to the feed port 311 in a solid state. The feed port 311 is formed at the rear of the cylinder 310. A cooler 312, such as a water-cooling cylinder, is provided on the outer periphery at the rear of the cylinder 310. In front of the cooler 312, the outer circumference of the cylinder 310 is provided with a heater 313 such as a band heater and a temperature detector 314.

The cylinder 310 is divided into multiple zones in the axial direction (e.g., X-axis direction) of the cylinder 310. Each of the multiple zones is provided with the heater 313 and the temperature detector 314. A set temperature is set in each of the multiple zones, and the control device 700 controls the heater 313 so that the temperature detected by the temperature detector 314 becomes the set temperature.

The nozzle 320 is provided at the front end of the cylinder 310 and is pressed against the mold unit 800. A heater 313 and a temperature detector 314 are provided on the outer periphery of the nozzle 320. The control device 700 controls the heater 313 so that the detected temperature of the nozzle 320 becomes the set temperature.

The screw 330 is arranged so as to be rotatable and movable back and forth in the cylinder 310. As the screw 330 is rotated, the molding material is sent forward along the spiral groove of the screw 330. The molding material is gradually melted by heat from the cylinder 310 while being sent forward. As the liquid molding material is sent to the front of the screw 330 and accumulated at the front of the cylinder 310, the screw 330 is retracted. Subsequently, when the screw 330 is advanced, the liquid molding material accumulated in front of the screw 330 is injected from the nozzle 320 and is filled into the mold unit 800.

A backflow prevention ring 331 is attached to the front of the screw 330, so as to be movable back and forth, as a backflow prevention valve to prevent the backflow of the molding material from the front to the rear of the screw 330 when the screw 330 is pushed forward.

As the screw 330 is advanced, the backflow prevention ring 331 is pushed backward by the pressure of the molding material in front of the screw 330 and retreats relative to the screw 330 to a blocking position (see FIG. 2) that blocks the flow path of the molding material. This prevents the molding material accumulated in front of the screw 330 from flowing backward.

On the other hand, when the screw 330 is rotated, the backflow prevention ring 331 is pushed forward by the pressure of the molding material sent forward along the spiral groove of the screw 330 and is advanced relative to the screw 330 to an open position (see FIG. 1) that opens the flow path of the molding material. This sends the molding material to the front of the screw 330.

The backflow prevention ring 331 may be either a co-rotating type that rotates together with the screw 330 or a non-co-rotating type that does not rotate with the screw 330.

The injection unit 300 may include a driving source that moves the backflow prevention ring 331 back and forth with respect to the screw 330 between the open position and the closed position.

The metering motor 340 rotates the screw 330. The driving source for rotating the screw 330 is not limited to the metering motor 340, but may be, for example, a hydraulic pump.

An injection motor 350 moves the screw 330 back and forth. Between the injection motor 350 and the screw 330, a motion conversion mechanism or the like is provided to convert the rotational motion of the injection motor 350 into the linear motion of the screw 330. The motion conversion mechanism includes, for example, a screw shaft and a screw nut that screws into the screw shaft. A ball, roller or the like may be provided between the screw shaft and the screw nut. The driving source for moving the screw 330 forward and backward is not limited to the injection motor 350, but may be, for example, a hydraulic cylinder.

The load detector 360 detects the load transmitted between the injection motor 350 and the screw 330. The detected load is converted to pressure by the control device 700. A load detector 360 is provided in the transmission path of the load between the injection motor 350 and the screw 330 to detect the load acting on the load detector 360.

The load detector 360 sends a signal of the detected load to the control device 700. The load detected by the load detector 360 is converted into the pressure acting between the screw 330 and the molding material and is used to control and monitor the pressure that the screw 330 receives from the molding material, the back pressure against the screw 330, the pressure acting on the molding material from the screw 330, and the like.

The pressure detector for detecting the pressure of the molding material is not limited to the load detector 360, but a general pressure detector can be used. For example, a nozzle pressure sensor or a mold internal pressure sensor may be used. A nozzle pressure sensor will be installed in the nozzle 320. The mold internal pressure sensor will be installed inside the mold unit 800.

The injection unit 300 performs a metering process, a filling process, a hold pressure process, etc., under the control of the control device 700. The filling process and the hold pressure process may be collectively referred to as "the injection process".

In the metering process, the metering motor 340 is driven to rotate the screw 330 at a set rotational speed and feed the molding material forward along the spiral groove of the screw 330. Accordingly, the molding material is gradually melted. As the liquid molding material is sent in front of the screw 330 and accumulated at the front of the cylinder 310, the screw 330 is retracted. The rotational speed of the screw 330 is detected by using, for example, a metering motor encoder 341. The metering motor encoder 341 detects the rotation of the metering motor 340 and sends a signal indicating the detection result to the control device 700. The screw rotational speed detector for detecting the rotational speed of the screw 330 is not limited to the metering motor encoder 341, and general detectors can be used.

In the metering process, a set back pressure may be applied to the screw 330 by driving the injection motor 350 to limit the sudden retraction of the screw 330. The back pressure against the screw 330 is detected by using, for example, the load detector 360. When the screw 330 is retracted to the metering completion position and a predetermined amount of molding material accumulates in front of the screw 330, the metering process is completed.

The position and rotational speed of the screw 330 in the metering process are set together as a series of setting conditions. For example, a metering start position, a rotational speed switching position, and a metering completion position are set. These positions are arranged in the stated order from the front to the back and represent the start point and an end point of a section for which the rotational speed is set. For each section, a rotational speed is set. One or more rotational speed switching positions may be provided. The rotational speed switching position need not be set. Also, back pressure is set for each section.

In the filling process, the injection motor 350 is driven to advance the screw 330 at a set moving speed, and the liquid molding material accumulated in front of the screw 330 is filled into the cavity space 801 in the mold unit 800. The position and moving speed of the screw 330 are detected by using, for example, an injection motor encoder 351. The injection motor encoder 351 detects the rotation of the injection motor 350 and sends a signal indicating the result of the detection to the control device 700. When the position of the screw 330 reaches the set position, switching (what is termed as V/P switching) from the filling process to the hold pressure process is performed. The position where the V/P switching is performed is referred to as "the V/P switching position". The set moving speed of the screw 330 may be changed according to the position of the screw 330, time, etc.

The position and moving speed of the screw 330 in the filling process are set together as a series of setting conditions. For example, a filling start position (also referred to as "the injection start position"), a moving speed switching position, and a V/P switching position are set. These positions are arranged in the stated order from the back to the front and represent the start point and the end point of the section in which the moving speed is set. For each section, a moving speed is set. The moving speed switching position may be one or more. The moving speed switching position need not be set.

For each section where the moving speed of the screw 330 is set, an upper limit of the pressure of the screw 330 is set. The pressure of the screw 330 is detected by the load detector 360. If the pressure of the screw 330 is less than or equal to the set pressure, the screw 330 is advanced at the set moving speed. On the other hand, if the pressure of the screw 330 exceeds the set pressure, the screw 330 is advanced at a slower moving speed than the set moving speed so that the pressure of the screw 330 is less than or equal to the set pressure, for the purpose of mold protection.

After the position of the screw 330 reaches the V/P switching position in the filling process, the screw 330 may be temporarily stopped at the V/P switching position, and then the V/P switching may be performed. Immediately before the V/P switching, a slow forward or slow backward movement of the screw 330 may be performed instead of stopping the screw 330. Moreover, the screw position detector for detecting the position of the screw 330 and the screw moving speed detector for detecting the moving speed of the screw 330 are not limited to the injection motor encoder 351, and general detectors can be used.

During the hold pressure process, the injection motor 350 is driven to push the screw 330 forward, keeping the pressure of the molding material at the front end of the screw 330 (hereafter, also referred to as "holding pressure") at a set pressure, and pushing the remaining molding material in the cylinder 310 toward the mold unit 800. The amount of molding material that is deficient due to cooling and contracting in the mold unit 800 can be replenished. The holding pressure is detected by using, for example, the load detector 360. The set value of the holding pressure may be changed according to the elapsed time from the start of the hold pressure process, etc. The holding pressure in the hold pressure process and the time for holding the holding pressure may be set multiple times, respectively, and may be set together as a series of setting conditions.

During the hold pressure process, the molding material in the cavity space 801 in the mold unit 800 is gradually cooled, and upon completion of the hold pressure process, the inlet of the cavity space 801 is blocked by the solidified molding material. This state is referred to as "a gate seal" and prevents backflow of the molding material from the cavity space 801. After the hold pressure process, a cooling process is initiated. The cooling process involves solidifying the molding material in the cavity space 801. The metering process may be performed during the cooling process for the purpose of shortening the molding cycle time.

The injection unit 300 of the present embodiment is an in-line screw system, but a preplasticizing system or the like may be used. The injection unit of the preplasticizing system supplies an injection cylinder with the molding material melted in the plasticizing cylinder, and the injection cylinder injects the molding material into a mold unit. Within the plasticizing cylinder, a screw is arranged so as to be rotatable and not movable back and forth, or the screw is arranged so as to be rotatable and movable back and forth. On the other hand, in the injection cylinder, a plunger is arranged so as to be movable back and forth.

Further, the injection unit 300 of the present embodiment is a horizontal type in which the axial direction of the cylinder 310 is horizontal, but may be a vertical type in which the axial direction of the cylinder 310 is vertical. The mold clamping unit combined with the vertical injection unit 300 may be either vertical or horizontal. Similarly, the mold clamping unit combined with the horizontal injection unit 300 may be either horizontal or vertical.

(Moving Unit)

In the description of the moving unit 400, as in the description of the injection unit 300, the moving direction of the screw 330 during filling (for example, the negative X-axis direction) is referred to as "forward", and the moving direction of the screw 330 during metering (for example, the positive X-axis direction) is referred to as the "backward".

The moving unit 400 moves the injection unit 300 forward and backward with respect to the mold unit 800. The moving unit 400 also presses the nozzle 320 against the mold unit 800 to produce nozzle touch pressure. The moving unit 400 includes a hydraulic pump 410, a motor 420 as a driving source, a hydraulic cylinder 430 as a hydraulic actuator, etc.

The hydraulic pump 410 has a first port 411 and a second port 412. The hydraulic pump 410 is a pump that can rotate in both directions, and by switching the rotation direction of the motor 420, hydraulic fluid (e.g., oil) is drawn from either one of the first port 411 or the second port 412 and discharged from the other port to generate hydraulic pressure. The hydraulic pump 410 can also suction the hydraulic fluid from a tank and discharge the hydraulic fluid from either the first port 411 or the second port 412.

The motor 420 operates the hydraulic pump 410. The motor 420 drives the hydraulic pump 410 in a rotational direction and by a rotational torque according to a control signal from the control device 700. The motor 420 may be an electric motor or an electric servomotor.

The hydraulic cylinder 430 has a cylinder body 431, a piston 432, and a piston rod 433. The cylinder body 431 is fixed to the injection unit 300. The piston 432 divides the inside of the cylinder body 431 into a front chamber 435 as a first chamber and a rear chamber 436 as a second chamber. The piston rod 433 is fixed to the stationary platen 110.

The front chamber 435 of the hydraulic cylinder 430 is connected to the first port 411 of the hydraulic pump 410 through a first flow path 401. The hydraulic fluid discharged from the first port 411 is supplied to the front chamber 435 through the first flow path 401, and the injection unit 300 is pushed forward. The injection unit 300 is advanced and the nozzle 320 is pressed against the stationary mold 810. The front chamber 435 functions as a pressure chamber that generates the nozzle touch pressure of the nozzle 320 by the pressure of the hydraulic fluid supplied from the hydraulic pump 410.

On the other hand, the rear chamber 436 of the hydraulic cylinder 430 is connected to the second port 412 of the hydraulic pump 410 through a second flow path 402. When the hydraulic fluid discharged from the second port 412 is supplied to the rear chamber 436 of the hydraulic cylinder 430 through the second flow path 402, the injection unit 300 is pushed backward. The injection unit 300 is retracted and the nozzle 320 is separated from the stationary mold 810.

Note that in the present embodiment, the moving unit 400 includes the hydraulic cylinder 430, but the present invention is not limited thereto. For example, instead of the hydraulic cylinder 430, an electric motor and a motion conversion mechanism that converts the rotational motion of the electric motor into the linear motion of the injection unit 300 may be used.

(Control Device)

The control device 700 is configured by, for example, a computer, and includes a CPU (Central Processing Unit) 701, a storage medium 702 such as a memory, an input interface (I/F) 703, and an output I/F 704 as illustrated in FIGS. 1 and 2. The control device 700 performs various control operations by having the CPU 701 execute a program stored in the storage medium 702. Further, the control device 700 receives a signal from the outside by the input I/F 703 and transmits a signal to the outside by the output I/F 704. Further, the control device 700 may transmit and receive information to and from an information processing apparatus (a personal computer, for example) by using a communication interface (not illustrated).

The control device 700 repeatedly manufactures a molding product by repeating the metering process, the mold closing process, the pressure-boosting process, the mold clamping process, the filling process, the hold pressure process, the cooling process, the pressure-releasing process, the mold opening process, and the ejection process. The sequence of operations to produce a molding product, for example, from the beginning of the metering process to the beginning of the next metering process, is referred to as a "shot" or a "molding cycle". The time required for one shot is also referred to as the "molding cycle time" or the "cycle time".

One molding cycle includes, for example, a metering process, a mold closing process, a pressure-boosting process, a mold clamping process, a filling process, a hold pressure process, a cooling process, a pressure-releasing process, a mold opening process, and an ejection process, in the stated order. This order is the order of the start of each process. The filling process, the hold pressure process, and the cooling process are performed during the mold clamping process. The start of the mold clamping process may coincide with the start of the filling process. The completion of the pressure-releasing process coincides with the start of the mold opening process.

Multiple processes may be performed simultaneously for the purpose of shortening the molding cycle time. For example, the metering process may be performed during the cooling process of the previous molding cycle or during the mold clamping process. In this case, the mold closing process may be performed at the beginning of the molding cycle. The filling process may also be started during the mold closing process. The ejection process may also be started during the mold opening process. If an opening/closing valve is provided to open and close the flow path of the nozzle 320, the mold opening process may be started during the metering process. This is because even if the mold opening process is started during the metering process, the molding material does not leak from the nozzle 320 if the opening/closing valve closes the flow path of the nozzle 320.

Note that a single molding cycle may include processes other than the metering process, the mold closing process, the pressure-boosting process, the mold clamping process, the filling process, the hold pressure process, the cooling process, the pressure-releasing process, the mold opening process, and the ejection process.

For example, after the completion of the hold pressure process and before the start of the metering process, a pre-metering suck back process may be performed in which the screw 330 is retracted to a preset metering start position. The pressure of the molding material accumulated in front of the screw 330 before the start of the metering process can be reduced and the sudden retreat of the screw 330 at the start of the metering process can be prevented.

After the completion of the metering process and before the start of the filling process, a post-metering suck back process may be performed in which the screw 330 is retracted to a preset filling start position (also referred to as "the injection start position"). The pressure of the molding material accumulated in front of the screw 330 before the start of the filling process can be reduced and the leakage of the molding material from the nozzle 320 before the start of the filling process can be prevented.

The control device 700 is connected to an operation device 750 that receives input operations by the user and a display device 760 that displays a screen. The operation device 750 and the display device 760 are configured by, for example, a touch panel 770 and may be integrated. The touch panel 770, as the display device 760, displays a screen under control by the control device 700. Information such as the settings of the injection molding machine 10 and the current status of the injection molding machine 10 may be displayed on the screen of the touch panel 770. The touch panel 770 can receive an operation in the displayed screen area. Moreover, in the screen area of the touch panel 770, for example, an operation part such as a button or an input field for receiving an input operation by the user may be displayed. The touch panel 770, as the operation device 750, detects an input operation on the screen by the user and outputs a signal corresponding to the input operation to the control device 700. Thus, for example, while confirming the information displayed on the screen, the user can operate the operation part provided on the screen to make settings of the injection molding machine 10 (including input of setting values), etc. When the user operates the operation part provided on the screen, the operation of the injection molding machine 10 corresponding to the operation part can be performed. The operation of the injection molding machine 10 may be, for example, the operation (including stopping) of the mold clamping unit 100, the ejector unit 200, the injection unit 300, the moving unit 400, etc. Further, the operation of the injection molding machine 10 may be, for example, switching the screen displayed on the touch panel 770 as the display device 760.

The operation device 750 and the display device 760 of the present embodiment are described as being integrated as the touch panel 770, but these devices may be provided independently. Further, a plurality of operation devices 750 may be provided. The operation device 750 and the display device 760 are arranged on the operation side (negative Y-axis direction) of the mold clamping unit 100 (more specifically, the stationary platen 110).

First Embodiment

Figure 3:
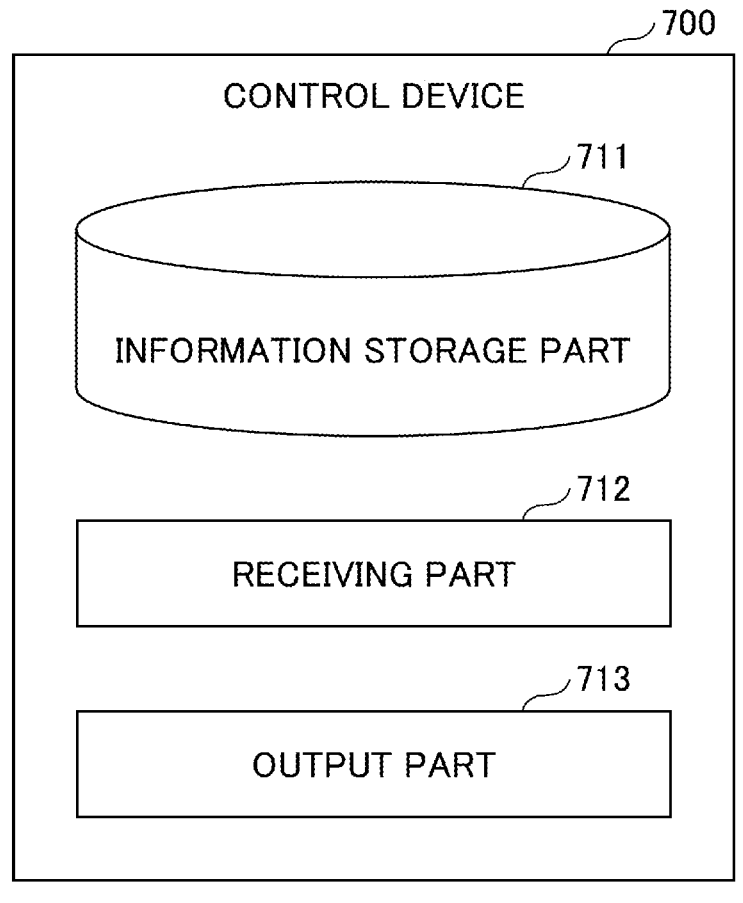
FIG. 3 is a diagram illustrating the elements of the control device according to the first embodiment in functional blocks.

FIG. 3 is a diagram illustrating the elements of the control device 700 according to one embodiment in functional blocks. Each functional block illustrated in FIG. 3 is conceptual and does not necessarily need to be physically constructed as illustrated. All or part of each functional block can be functionally or physically distributed and integrated by any unit. All or any part of each processing function performed in each functional block is implemented by a program executed by the CPU 701. Alternatively, each functional block may be implemented as hardware with wired logic. As illustrated in FIG. 3, the control device 700 includes a receiving part 712 and an output part 713. The control device 700 also includes an information storage part 711 in the storage medium 702.

The information storage part 711 stores log information indicating setting information set by a user, actual values detected by various sensors, and monitoring results or statistical values obtained by the control device 700.

The receiving part 712 receives the user's operation from the touch panel 770 via the input I/F 703.

The output part 713 outputs data such as a display screen to the touch panel 770. According to the present embodiment, for each process in the molding process by the injection molding machine 10, the output part 713 outputs, to the touch panel 770, a display screen including setting information set by the user in the process or waveform data (an example of waveform information) indicating, by a waveform, the change according to the actual value detected in the process. Although the present embodiment describes an example of outputting a display screen or the like to the touch panel 770, the output destination of data is not limited to the touch panel 770. For example, the output part 713 may output data such as a display screen to an information processing apparatus connected via a network.

Figure 4:
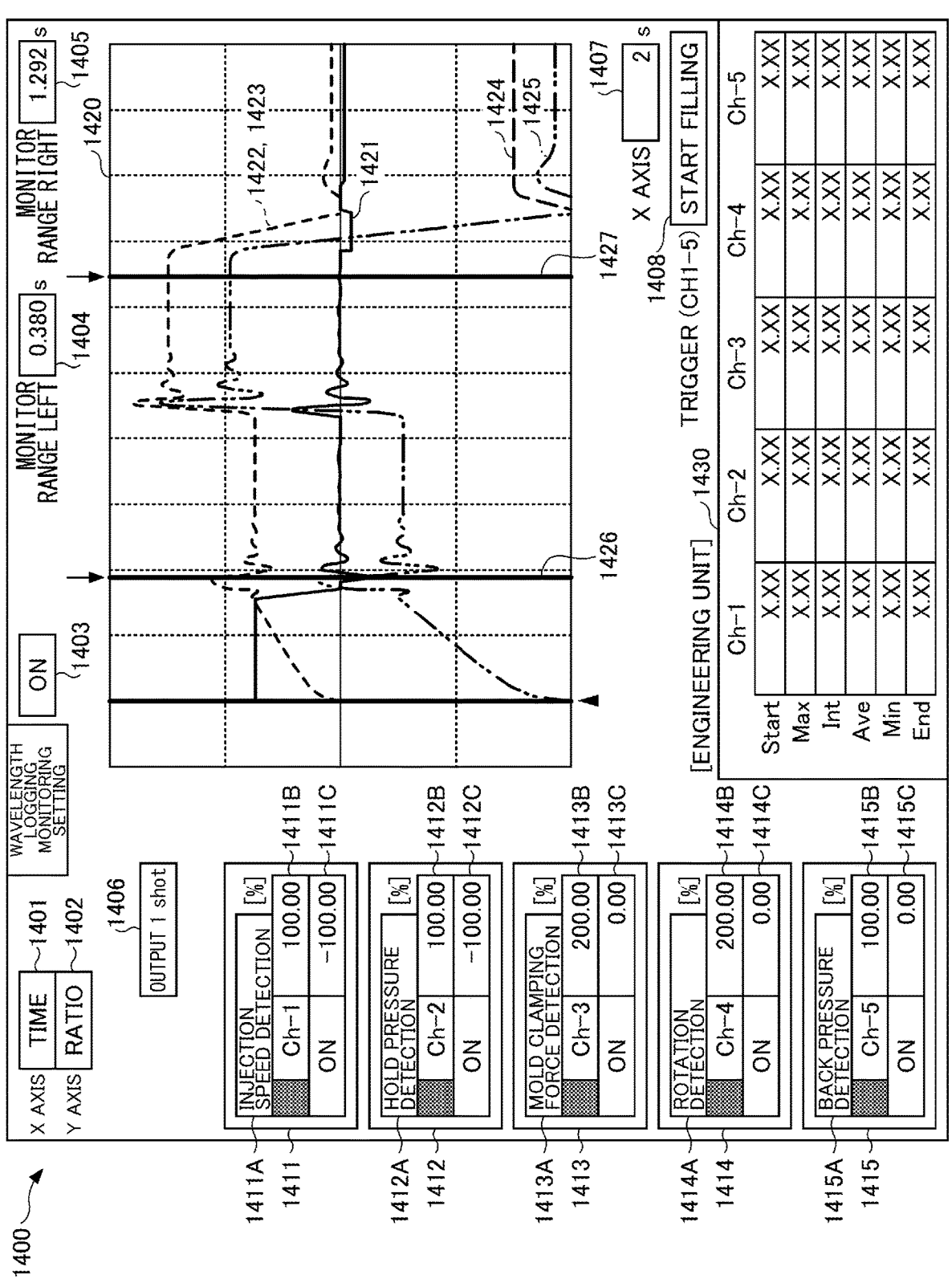
FIG. 4 illustrates an example of a display screen output by the output part according to the first embodiment.

FIG. 4 illustrates an example of the display screen output by the output part 713 of the present embodiment. As illustrated in FIG. 4, on a display screen 1400, an X-axis unit field 1401, a Y-axis unit field 1402, a waveform logging monitor setting 1403, a monitor range left 1404, a monitor range right 1405, a 1-shot output field 1406, an X-axis field 1407, and a trigger (Ch 1-5) field 1408 are indicated. Furthermore, the display screen 1400 indicates 5 channel fields (a 1st channel field 1411 to a 5th channel field 1415), a waveform data field 1420, and a selected range display field 1430. In the present embodiment, the channel field is a field for selecting items to be displayed.

In the display screen illustrated in FIG. 4, setting information for each shot of the injection molding machine 10 and actual values detected by various sensors are displayed. In the display screen of the present embodiment, the actual value of the current shot can also be displayed in real time.

The receiving part 712 receives a selection operation or an input operation in the above described field via the touch panel 770. Then, the output part 713 switches the display screen (for example, the waveform data field 1420 or the selected range display field 1430) displayed on the touch panel 770 according to the received selection operation or input operation.

For example, the receiving part 712 receives a selection operation or an input operation, through the touch panel 770, for the X-axis unit field 1401, the Y-axis unit field 1402, the 1-shot output field 1406, and the X-axis field 1407. The output part 713 switches the displayed waveform data field 1420 according to the received selection operation.

The X-axis unit field 1401 is a field for selecting the unit to be displayed on the X-axis of the waveform data field 1420. For example, "time" or "screw position" can be selected. The Y-axis unit field 1402 is a field for selecting a unit to be displayed on the Y-axis of the waveform data field 1420. In the Y-axis unit field 1402, for example, "ratio" or "engineering unit" can be selected. The 1-shot output field 1406 is a button for storing information about the shot including the process currently displayed in the waveform data field 1420, etc. The X-axis field 1407 is a field for setting the range of the X-axis (e.g., time) to be displayed in the waveform data field 1420.

The waveform logging monitor setting 1403 is a field for setting whether information indicating the processing result by the injection molding machine 10 is to be stored in the information storage part 711. In the present embodiment, when the waveform logging monitor setting 1403 is pressed (when the display is "on"), the output part 713 controls the information storage part 711 to store the information.

The monitor range left 1404 is a field for setting the left end (display start position) on the X-axis of the waveform data field 1420 in order to set the range to be displayed in the selected range display field 1430. In the present embodiment, the monitor range left 1404 and a left slider 1426 (an example of instruction information) displayed in the waveform data field 1420 are linked. The left slider 1426 points to the left end (display start position) on the X-axis for setting the range of the selected range display field 1430. When a numerical value is input to the monitor range left 1404, the output part 713 generates and outputs a display screen in which the left slider 1426 has moved according to the numerical value.

The monitor range right 1405 is a field for setting the right edge (display end position) on the X-axis of the waveform data field 1420 in order to set the range to be displayed in the selected range display field 1430. In the present embodiment, the monitor range right 1405 and a right slider 1427 (an example of instruction information) displayed in the waveform data field 1420 are linked. The right slider 1427 points to the right end (display end position) on the X-axis for setting the range of the selected range display field 1430. Then, when a numerical value is input to the monitor range right 1405, the output part 713 generates and outputs a display screen in which the right slider 1427 has moved according to the numerical value.

The trigger (Ch 1-5) field 1408 is a field for selecting a process to be displayed in the waveform data field 1420. The trigger (Ch 1-5) field 1408 according to the present embodiment has the form of a menu, for example. Through the touch panel 770, the user performs an operation to select a process to be displayed from a menu in which a plurality of processes are displayed. This updates the process displayed in the trigger (Ch 1-5) field 1408.

In FIG. 4, the trigger (Ch 1-5) field 1408 is assumed to be an example in which the process "start filling" is selected (set). In the example illustrated in FIG. 4, in the process "start filling", the output part 713 outputs a display screen in which the waveform data of each item set in the 5 channel fields (the 1st channel field 1411 to the 5th channel field 1415) is indicated in the waveform data field 1420. In the example illustrated in FIG. 4, in the trigger (Ch 1-5) field 1408, it is assumed that an operation of selecting (setting) "start filling" has been performed. The output part 713 outputs a display screen indicating the waveform data field 1420 including the waveform data of each item set in the 5 channel fields (the 1st channel field 1411 to the 5th channel field 1415), in the process "start filling".

The 5 channel fields (the 1st channel field 1411 to the 5th channel field 1415) are used to select items to be displayed as waveform data in the waveform data field 1420. That is, in the present embodiment, five pieces of waveform data related to item allocated to each channel can be displayed in the waveform data field 1420.

The 1st channel field 1411 is a field for setting items in Ch-1. The item to be displayed is set in the item field 1411A, the maximum value (an example of scale information) to be displayed as the waveform data of the item of Ch-1 is set in the maximum value field 1411B, and the minimum value (an example of scale information) to be displayed as the waveform data of the item of Ch-1 is set in the minimum value field 1411C.

When the item field 1411A is pressed through the touch panel 770, the output part 713 outputs a menu screen on which a plurality of items are displayed. Then, the receiving part 712 receives the selection of the item to be set to Ch-1 from the menu screen. The same applies to the item fields 1412A to 1415A, and, therefore, the explanations thereof are omitted.

The maximum value field 1411B and the minimum value field 1411C are fields in which numerical values can be input. Further, the receiving part 712 receives the input of the numerical value set via the touch panel 770 into the maximum value field 1411B or the minimum value field 1411C. The same applies to the maximum value fields 1412B to 1415B and the minimum value fields 1412C to 1415C, and, therefore, the explanations thereof are omitted.

In each channel field, "ON" or "OFF" can be set and displayed. "ON" indicates that the waveform data of the corresponding item is to be displayed, and "OFF" indicates that the waveform data of the corresponding item is not to be displayed.

In the example illustrated in FIG. 4, it is assumed that "injection speed detection" is set in the item field 1411A, "100.00" is set in the maximum value field 1411B, and "−100.00" is set in the minimum value field 1411C. "Injection speed detection" indicates the injection speed of the screw 330 detected by the injection motor encoder 351.

The 2nd channel field 1412 is a field for setting items in Ch-2. The item to be displayed is set in the item field 1412A, the maximum value (an example of scale information) to be displayed as the waveform data of the item of Ch-2 is set in the maximum value field 1412B, and the minimum value (an example of scale information) to be displayed as the waveform data of the item of Ch-2 is set in the minimum value field 1412C.

In the example illustrated in FIG. 4, it is assumed that "hold pressure detection" is set in the item field 1412A, "100.00" is set in the maximum value field 1412B, and "−100.00" is set in the minimum value field 1412C. "Hold pressure detection" indicates the value of holding pressure detected by the load detector 360.

The 3rd channel field 1413 is a field for setting items in Ch-3. The item to be displayed is set in the item field 1413A, the maximum value (an example of scale information) to be displayed as the waveform data of the item of Ch-3 is set in the maximum value field 1413B, and the minimum value (an example of scale information) to be displayed as the waveform data of the item of Ch-3 is set in the minimum value field 1413C.

In the example illustrated in FIG. 4, it is assumed that "mold clamping force detection" is set in the item field 1413A, "200.00" is set in the maximum value field 1413B, and "0.00" is set in the minimum value field 1413C. "Mold clamping force detection" indicates the mold clamping force detected by the tie bar distortion detector 141.

The 4th channel field 1414 is a field for setting items in Ch-4. The item to be displayed is set in the item field 1414A, the maximum value (an example of scale information) to be displayed as the waveform data of the item of Ch-4 is set in the maximum value field 1414B, and the minimum value (an example of scale information) to be displayed as the waveform data of the item of Ch-4 is set in the minimum value field 1414C.

In the example illustrated in FIG. 4, it is assumed that "rotation detection" is set in the item field 1414A, "200.00" is set in the maximum value field 1414B, and "0.00" is set in the minimum value field 1414C. "Rotation detection" indicates the rotational speed of the screw 330 detected by the metering motor encoder 341.

The 5th channel field 1415 is a field for setting items in Ch-5. The item to be displayed is set in the item field 1415A, the maximum value (an example of scale information) to be displayed as the waveform data of the item of Ch-5 is set in the maximum value field 1415B, and the minimum value (an example of scale information) to be displayed as the waveform data of the item of Ch-5 is set the minimum value field 1415C.

In the example illustrated in FIG. 4, it is assumed that "back pressure detection" is set in the item field 1415A, "100.00" is set in the maximum value field 1415B, and "0.00" is set in the minimum value field 1415C. "Back pressure detection" indicates the back pressure of the screw 330 detected by the load detector 360.

The waveform data field 1420 in FIG. 4 displays waveform data indicating, in the form of a waveform, the value (change in actual value or change in setting information) of each item set in each of the 5 channel fields (the 1st channel field 1411 to the 5th channel field 1415), in the process selected in the trigger (Ch 1-5) field 1408.

The waveform data 1421 in the waveform data field 1420 illustrates the change in the detection result (an example of the actual value) of the "injection speed detection" set in the 1st channel field 1411 (Ch-1).

The maximum value of the waveform data field 1420 for displaying the waveform data 1421 is the value set in the maximum value field 1411B, and the minimum value of the waveform data field 1420 for displaying the waveform data 1421 is the value set in the minimum value field 1411C. The same applies to the maximum and minimum values of the waveform data displayed in the waveform data field 1420 with respect to the subsequent items, and, therefore, the explanations thereof are omitted.

The waveform data 1422 indicates a change in the detection result (an example of the actual value) of "hold pressure detection" set in the 2nd channel field 1412 (Ch-2).

The waveform data 1423 indicates the change in the detection result (an example of the actual value) of the "mold clamping force detection" set in the 3rd channel field 1413 (Ch-3).

The waveform data 1424 indicates the change in the detection result (an example of the actual value) of the "rotation detection" set in the 4th channel field 1414 (Ch-4).

The waveform data 1425 indicates the change in the detection result (an example of the actual value) of the "back pressure detection" set in the 5th channel field 1415 (Ch-5).

The receiving part 712 according to the present embodiment receives selections of items with respect to the item fields 1411A to 1415A of each channel field as information to be displayed for the process selected in the trigger (Ch 1-5) field 1408.

When the receiving part 712 receives the selection of an item, the output part 713 displays, in the waveform data field 1420, the waveform data indicating the change in the setting information or the detection result of the item received as selection.

In the output part 713, the left slider 1426 (the starting value on the left side of the X-axis in the waveform data field 1420) and the right slider 1427 (the ending value on the right side of the X-axis in the waveform data field 1420) are displayed in the waveform data field 1420.

When the receiving part 712 receives the operation of sliding in the left or right direction from the touch panel 770, the output part 713 displays the left slider 1426 moved to the right or left direction in the waveform data field 1420. The numerical value displayed in the monitor range left 1404 changes according to the numerical value pointed by the left slider 1426 that has moved.

When the receiving part 712 receives the operation of sliding in the left or right direction from the touch panel 770, the output part 713 displays the right slider 1427 moved to the right or left direction in the waveform data field 1420. The numerical value displayed in the monitor range right 1405 changes according to the numerical value pointed by the right slider 1427 that has moved.

The selected range display field 1430 indicates a list of the statistical values, the starting value, the ending value, etc., for each item set in each channel field within the range set by the left slider 1426 and the right slider 1427.

In the selected range display field 1430 illustrated in FIG. 4, statistical values, etc., of items set in each of the channels (Ch-1 to Ch-5), for example, the leftmost start value (Start), the maximum value in the range (Max), the integral value in the range (Int), the average value in the range (Ave), the minimum value in the range (Min), and the rightmost end value (End) are displayed. Statistical values, etc., for each item indicated in the selected range display field 1430 are indicated as an example, and other statistical values, etc., may be displayed.

Specifically, the selected range display field 1430 displays the leftmost start value (Start), the maximum value in the range (Max), the integral value in the range (Int), the average value in the range (Ave), the minimum value in the range (Min), and the rightmost end value (End), in the range from the start value of the X-axis indicated by the left slider 1426 to the end value of the X-axis indicated by the right slider 1427, in the "injection speed detection" set to "Ch-1".

Note that descriptions with respect to "hold pressure detection" set to "Ch-2", "mold clamping force detection" set to "Ch-3", "rotation detection" set to "Ch-4", and "back pressure detection" set to "Ch-5", which are displayed in the selected range display field 1430, are also similar to "Ch-1", and, therefore, descriptions are omitted.

By calculating the integral value (Int) of the "back pressure detection", the output part 713 can display the total pressure applied to the resin or the like in the specified range. Thus, the control device 700 according to the present embodiment can determine whether there is a defect based on the total pressure applied to the resin (e.g., determine whether the integral value is greater than or equal to a predetermined reference value Pth).

In the present embodiment, the output part 713 displays, in the waveform data field 1420, the change of the actual value or the like associated with the passage of time or the like in the set process. The user visually checks the relevant waveform data field 1420 and specifies the X-axis range (e.g., time zone) to be confirmed, via the touch panel 770 with the left slider 1426 and the right slider 1427 (the monitor range left 1404 and the monitor range right 1405).

That is, the range (e.g., time zone) that the user wants to monitor in any process may be limited. For example, there is a case where it is desired to detect the pressure on the resin when the resin passes through the gate of the mold unit 800 in the process of injecting the resin "injection start". In such a case, the time period when the resin passes through the gate is specified by the left slider 1426 and the right slider 1427, from the position or the like of the screw 330 displayed in the waveform data field 1420. The item "back pressure detection" is then set to any channel. Thus, the output part 713 can display, in the selected range display field 1430, statistical values and the like at the time when the resin passes through the gate. Then, the user can visually check the selected range display field 1430 to determine whether the molding product is appropriate or not. Such a setting needs to be specified by the user because the setting varies depending on the mold unit 800. On the other hand, the control device 700 according to the present embodiment can display statistical values and the like in any range with respect to items desired by the user by the above configuration.

Furthermore, in the case where it is desired to monitor the minimum value, the maximum value, or the total pressure (integral value) pertaining to the resin for any item within a limited range, the minimum value, the maximum value, or the total pressure (integral value) pertaining to the resin can be monitored by specifying the range by the left slider 1426 and the right slider 1427 as described above. Furthermore, by setting a determination reference for the statistical value in the range, it is possible to determine whether the molding product is defective or not. For example, if the total pressure at two seconds after injection does not exceed a predetermined reference, the molding product may be determined as defective. The setting method of the determination will be described later with FIG. 7.

In the present embodiment, the user performs the sliding operation with respect to the left slider 1426 and the right slider 1427 displayed on the display screen displayed on the touch panel 770. Accordingly, the receiving part 712 receives a moving operation of one or both of the left slider 1426 and the right slider 1427. In the present embodiment, the range for calculating the statistical value can be specified by an operation of moving the left slider 1426 and the right slider 1427 displayed on the touch panel 770. That is, because the range can be specified by intuitive operations by the user, the operational load can be reduced in the present embodiment.

The trigger (Ch 1-5) field 1408 is a field for selecting a process to be displayed in the waveform data field 1420. The trigger (Ch 1-5) field 1408 according to the present embodiment is in the form of a menu. The receiving part 712 receives, via the touch panel 770, an operation to select a process to be displayed, from among the multiple processes indicated on the menu screen.

When an operation to select a process is received, the output part 713 according to the present embodiment outputs a display screen indicating, in the waveform data field 1420, the waveform data of the selected items in the item fields 1411A to 1415A in the process set in the trigger (Ch 1-5) field 1408.

In the example illustrated in FIG. 4, an example in which the range in the X-axis direction (time) is specified by the left slider 1426 and the right slider 1427 is described. However, the present embodiment is not limited to an example of specifying the range in the X-axis direction (time); the range in the Y-axis direction (time) may be specified by multiple sliders (for example, an upper slider and a lower slider) or the like. For example, by specifying a value in the Y-axis direction (actual value or setting information) with a slider or the like, the output part 713 may output a list indicating the X-axis value (for example, time) when the specified value is reached for each item.

The example illustrated in FIG. 4 illustrates the display screen in the case of the process "start filling". The present embodiment can be applied to the processes other than the process "start filling". Furthermore, although FIG. 4 is an example of assigning items to Ch-1 to Ch-5, items may be assigned to even more channels (e.g., Ch-6 to Ch-10). This enables the monitoring of ten items during molding of the molding product.

Figure 5:
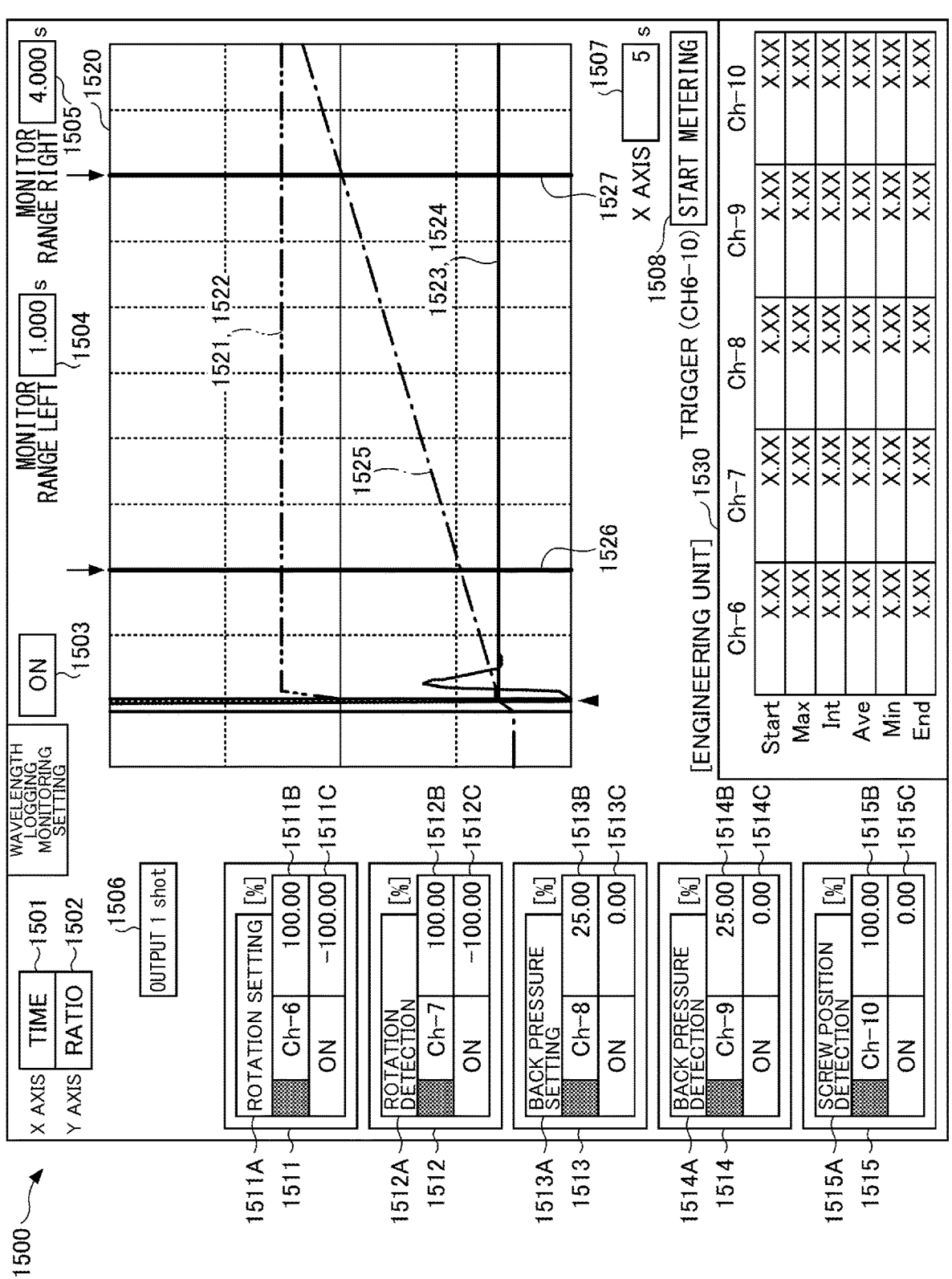
FIG. 5 illustrates an example of the display screen output by the output part according to the first embodiment.

FIG. 5 illustrates an example of the display screen output by the output part 713 of the present embodiment. As illustrated in FIG. 5, on a display screen 1500, an X-axis unit field 1501, a Y-axis unit field 1502, a waveform logging monitor setting 1503, a monitor range left 1504, a monitor range right 1505, a 1-shot output field 1506, an X-axis field 1507, and a trigger (Ch 6-10) field 1508 are indicated. Furthermore, the display screen 1500 indicates 5 channel fields (a 6th channel field 1511 to a 10th channel field 1515), a waveform data field 1520, and a selected range display field 1530. In the present embodiment, the channel field is a field for selecting items to be displayed.

Note that the X-axis unit field 1501, the Y-axis unit field 1502, the waveform logging monitor setting 1503, the 1-shot output field 1506, the X-axis field 1507, and the trigger (Ch 6-10) field 1508 are respectively the same as the X-axis unit field 1401, the Y-axis unit field 1402, the waveform logging monitor setting 1403, the 1-shot output field 1406, the X-axis field 1407, and the trigger (Ch 1-5) field 1408 illustrated in FIG. 4, and, therefore, descriptions thereof are omitted. Also, the monitor range left 1504 and the monitor range right 1505 are respectively the same as the monitor range left 1404 and the monitor range right 1405 in FIG. 4, and, therefore, descriptions thereof are omitted.

In this example, "rotation setting" is set in the item field 1511A, "100.00" is set in maximum value field 1511B, and "−100.00" is set in minimum value field 1511C. "Rotation setting" indicates the setting of the rotational speed of the screw 330.

In this example, "rotation detection" is set in the item field 1512A, "100.00" is set in the maximum value field 1512B, and "−100.00" is set in the minimum value field 1512C. "Rotation detection" indicates the rotational speed of the screw 330 detected by the metering motor encoder 341.

In this example, "back pressure setting" is set in the item field 1513A, "25.00" is set in the maximum value field 1513B, and "0.00" is set in the minimum value field 1513C. "Back pressure setting" indicates the setting of back pressure against the screw 330.

In this example, "back pressure detection" is set in the item field 1514A, "25.00" is set in the maximum value field 1514B, and "0.00" is set in the minimum value field 1514C. "Back pressure detection" indicates the back pressure against the screw 330 detected by the load detector 360.

In this example, "screw position detection" is set in the item field 1515A, "100.00" is set in the maximum value field 1515B, and "0.00" is set in the minimum value field 1515C. "Screw position detection" indicates the position of the screw 330 detected by the injection motor encoder 351.

The waveform data field 1520 in FIG. 5 displays waveform data indicating, in the form of a waveform, the value (change in actual value or change in setting information) of each item set in each of the 5 channel fields (the 6th channel field 1511 to the 10th channel field 1515), in the process "start metering" set in the trigger (Ch 6-10) field 1508.

Waveform data 1521 in the waveform data field 1520 indicates setting information of the "rotation setting" set in the 6th channel field 1511 (Ch-6). Waveform data 1522 indicates the change in the detection result (an example of the actual value) of the "rotation detection" set in the 7th channel field 1512 (Ch-7).

Waveform data 1523 indicates the setting information of the "back pressure setting" set in the 8th channel field 1513

(Ch-8). Waveform data 1524 indicates the change in the detection result (an example of the actual value) of the "back pressure detection" set in the 9th channel field 1514 (Ch-9).

Waveform data 1525 indicates the change in the detection result (an example of the actual value) of the "screw position detection" set in the 10th channel field 1515 (Ch-10).

In the selected range display field 1530, the leftmost value (Start), the maximum value in the range (Max), the integral value in the range (Int), the average value in the range (Ave), the minimum value in the range (Min), and the rightmost value (End) for the items set in each of the channels (Ch-6 to Ch-10) are displayed.

When the receiving part 712 receives a rightward or leftward operation from the touch panel 770, the output part 713 displays the left slider 1526 moved rightward or leftward in the waveform data field 1520.

When the receiving part 712 receives a rightward or leftward operation from the touch panel 770, the output part 713 displays the right slider 1527 moved rightward or leftward in the waveform data field 1520.

The selected range display field 1530 indicates a list of the statistical values, the starting value, the ending value, etc., for each item set in each channel field within the range set by the left slider 1526 and the right slider 1527.

Figure 6:
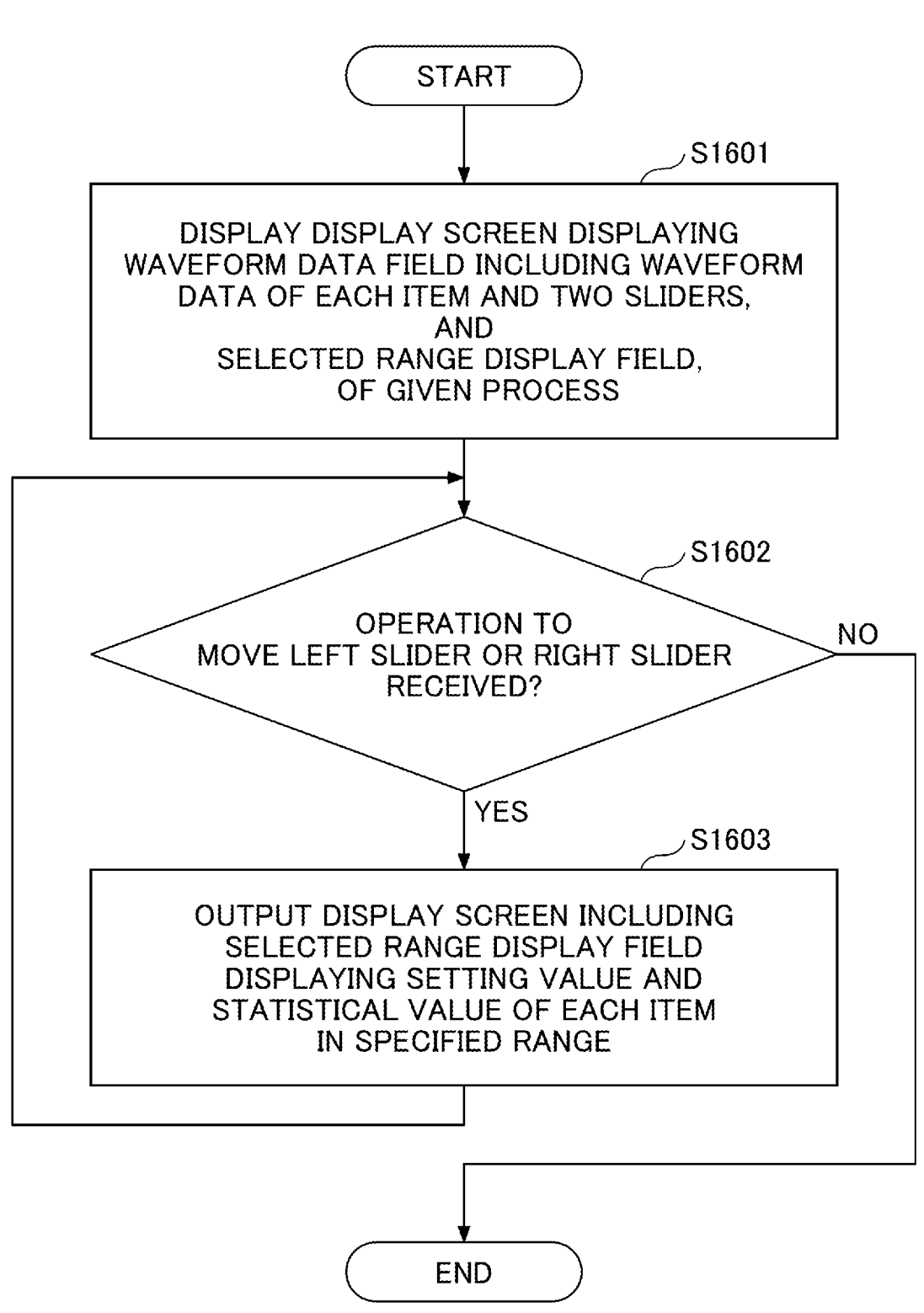
FIG. 6 is a flowchart illustrating the control performed when receiving a specification of a range specified in a selected range display field in the control device according to the first embodiment.

Next, the control procedure performed by the control device 700 according to the first embodiment, in the case of receiving a specification of the range to be specified in the selected range display field, will be described. FIG. 6 is a flowchart illustrating the control performed by the control device 700 according to the first embodiment, when receiving a specification of a range to be specified in the selected range display field.

First, the output part 713 of the control device 700 outputs (displays), to the touch panel 770, a display screen in which a waveform data field, including waveform data for each item and two sliders, and a selected range display field, in any process, are displayed (step S1601).

The receiving part 712 receives a moving operation for at least one of the left and right sliders indicated in the waveform data field (step S1602). The receiving part 712 may receive the input of a numerical value for at least one of the monitor range left and the monitor range right.

When the moving operation is received (step S1602: YES), the output part 713 outputs (displays) a display screen including a selected range display field in which setting information and statistical values for each item in the range specified in step S1602 are indicated (step S1603). Then, the process is performed from step S1602.

On the other hand, when the receiving part 712 does not receive a moving operation for at least one of the left and right sliders indicated in the waveform data field (when there is no moving operation) (step S1602: NO), the process ends.

In the present embodiment, the output part 713 stores actual values, setting information, statistical values, etc., during molding, as log information in the information storage part 711. Settings for storing this information as log information are made in a log information screen.

Figure 7:
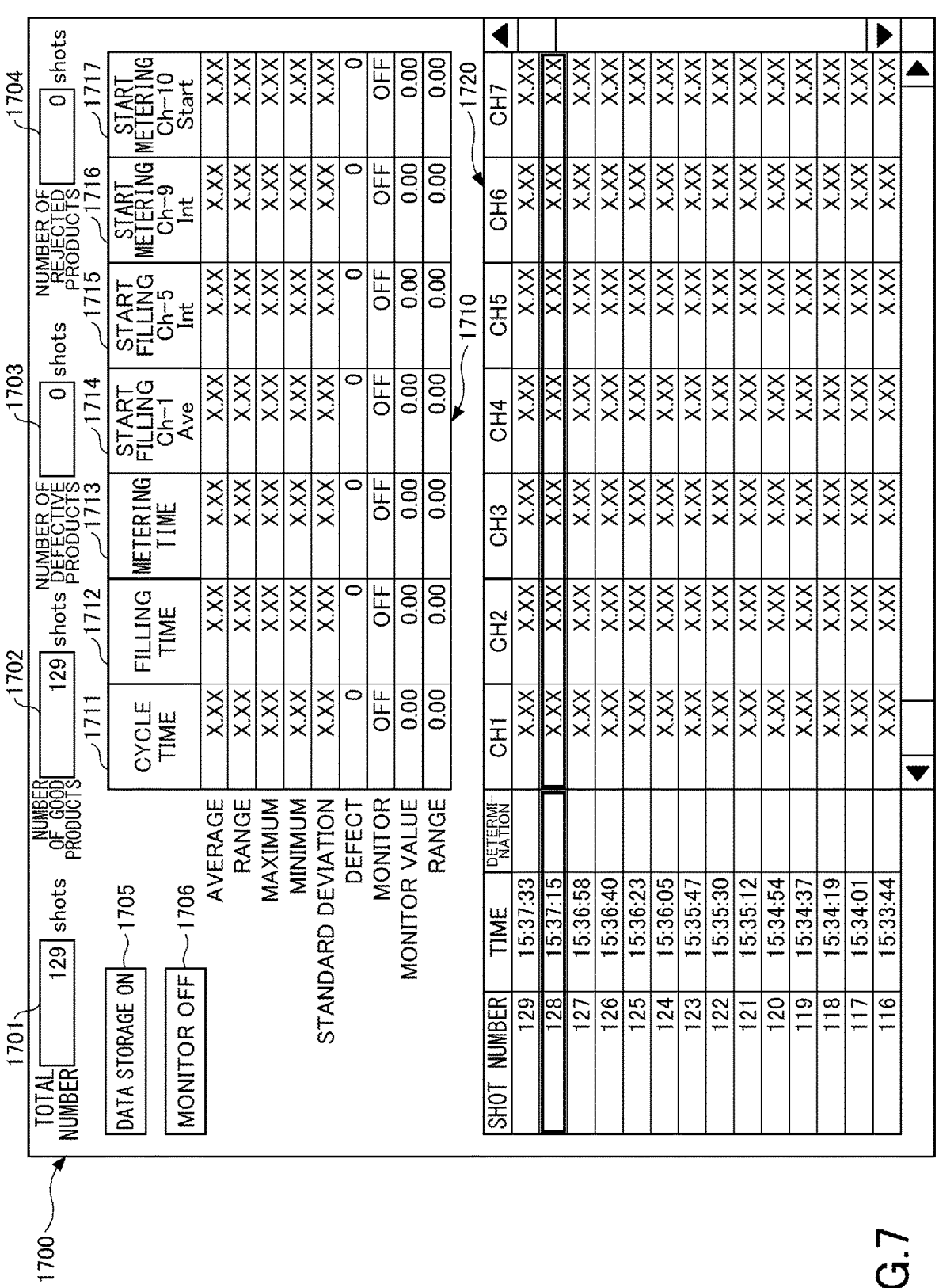
FIG. 7 illustrates an example of a log information screen output by the output part according to the first embodiment.

FIG. 7 is a diagram illustrating a log information screen output by the output part 713 according to the present embodiment. According to the settings of the log information screen, the output part 713 according to the present embodiment stores actual values and the like obtained by various sensors in the information storage part 711.

In the log information screen 1700 illustrated in FIG. 7, a total number 1701, a number of good products 1702, a number of defective products 1703, a number of rejected products 1704, a data storage button 1705, a monitor setting button 1706, a statistics list 1710, and an actual value list 1720 are indicated.

In the statistics list 1710, statistical values (e.g., average value, range, maximum value, minimum value, integral value, standard deviation, etc.) of each of the setting fields 1711 to 1717 are indicated. The contents indicated in the setting fields 1711 to 1717 can be set by the user. In the present embodiment, it is possible to display, monitor, and store log information about the items indicated in the setting fields 1711 to 1717. Note that the monitoring in the present embodiment refers to the determination of whether the product is good or not based on a predetermined reference.

"Monitor", "monitor value", and "range" in the statistics list 1710 are information for determining whether a product is defective in the setting field.

The output part 713 indicates that monitoring is not performed when monitor is "OFF", and indicates that monitoring is performed when monitor is "ON". In the case of "ON", the output part 713 determines whether the measured actual value in the item indicated in the setting field satisfies the reference indicated by "monitor value" and "range".

"Defect" in the statistics list 1710 indicates the number of molding products that do not satisfy the reference indicated by "monitor value" and "range".

The "cycle time" in the setting field 1711, the "filling time" in the setting field 1712, and the "metering time" in the setting field 1713 are preset items to monitor the time required for the cycle, filling, and metering.

The receiving part 712 receives, in the setting fields 1711 to 1717, changes to the items indicated in the selected range display fields 1430 and 1530 illustrated in FIG. 4 and FIG. 5.

"Start filling Ch-1 Ave" in the setting field 1714, "start filling Ch-5 Int" in the setting field 1715, "start metering Ch-9 Int" in the setting field 1716, and "start metering Ch-10 Start" in the setting field 1716 indicate examples in which changes to the items indicated in the selected range display fields 1430 and 1530 have been received.

For example, "start filling Ch-1 Ave" is set as an item to monitor "Ave" of "Ch-1". The same applies to "start filling Ch-5 Int" and "start metering Ch-9 Int".

The data storage button 1705 is a button that receives an instruction of whether to store statistical values (e.g., average value, range, maximum value, minimum value, integral value, standard deviation, etc.) for each of the setting fields 1711 to 1717. When the data storage button 1705 is pressed (displayed as "data storage ON"), the output part 713 stores the statistical values of each of the setting fields 1711 to 1717 at the time of molding in the information storage part 711. In the present embodiment, it is easy to store statistical values in any range set by the user, and, therefore, quality control is facilitated.

The monitor setting button 1706 is a button for receiving an instruction of whether to perform monitoring according to the item to be monitored in the setting field 1711. When the monitor setting button 1706 is pressed (displayed as "monitor on"), the output part 713 stores the statistical values and the like for each of the setting fields 1711 to 1717 in the information storage part 711 as log information.

The total number 1701 indicates the number of molding products molded in the injection molding machine 10. The number of good products 1702 indicates the number of molding products determined as good products based on "monitor", "monitor value" and "range". The number of defective products 1703 indicates the number of molding products determined as defective products based on "monitor", "monitor value", and "range". The number of rejected products 1704 indicates the number of rejected molding products.

The actual value list 1720 indicates, for each shot, a list of setting information or actual values measured by various sensors in each of the channels "Ch-1" to "Ch-10". The output part 713 also stores the information indicated in the actual value list 1720 in the information storage part 711.

The control device 700 according to the present embodiment has the configuration described above, and, therefore, when the user desires to confirm detailed information of any range of the waveform data displayed in the waveform data field, the user can easily select the corresponding range by operating the left and right sliders displayed in the waveform data field through the touch panel, thereby reducing the user's operational load when displaying detailed information within the corresponding range.

Second Embodiment

In the above embodiment, an example of displaying waveform data for one process on the display screen has been described. However, the control device 700 is not limited to the display mode described above. Therefore, in the second embodiment, an example of displaying the waveform data field in a different area for each of the multiple processes will be described. The configuration of the control device 700 of the second embodiment is the same as that of the first embodiment, and, therefore, the description thereof is omitted.

The output part 713 according to the present embodiment displays a display screen including a waveform data field for two processes when the receiving part 712 receives an operation to display two processes.

Figure 8:
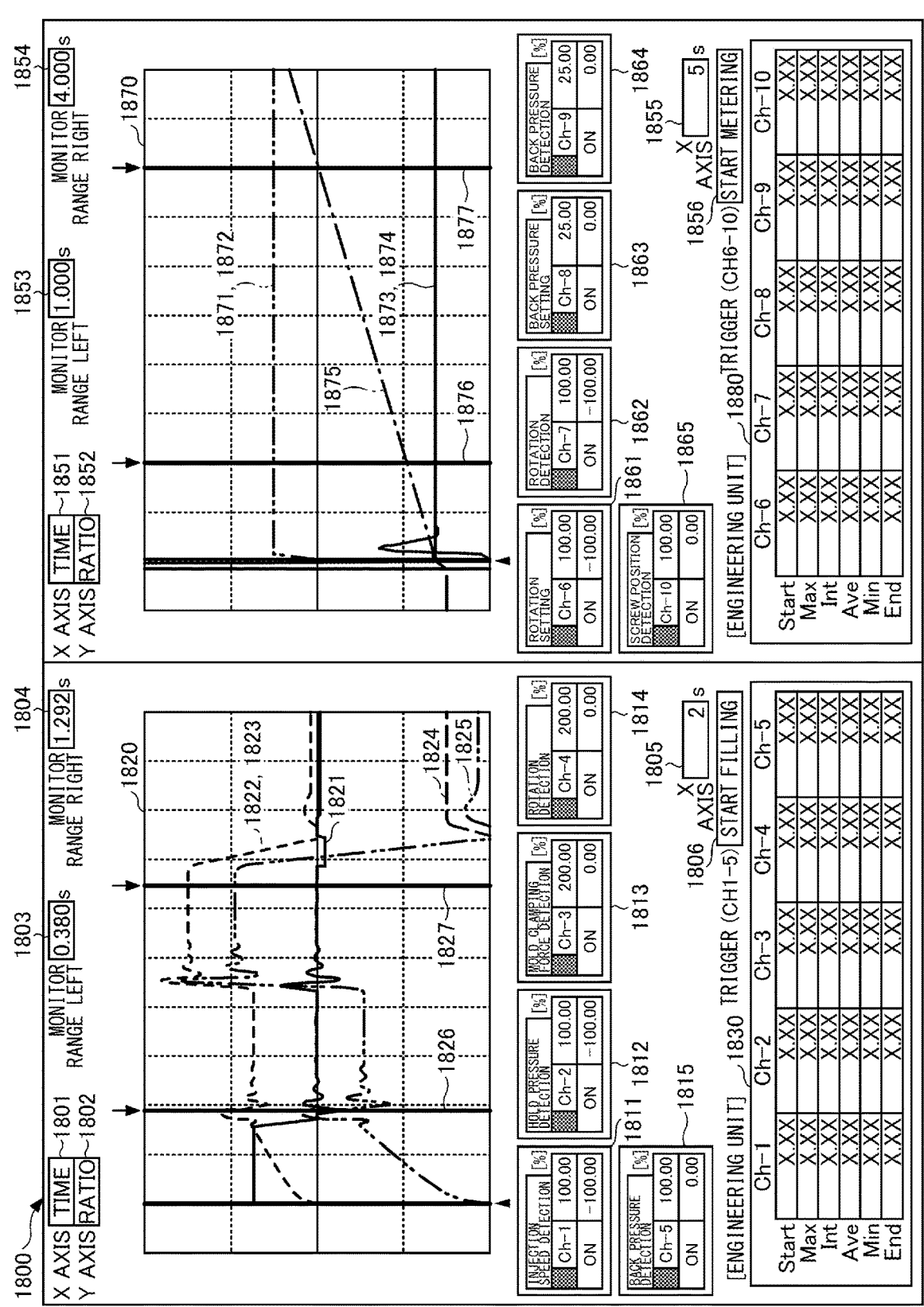
FIG. 8 illustrates an example of the display screen output by the output part according to a second embodiment.

FIG. 8 illustrates an example of a display screen output by the output part 713 of the present embodiment. As illustrated in FIG. 8, in a display screen 1800, a waveform data field 1820 for the process "start filling" and a waveform data field 1870 for the process "start metering" are displayed. As illustrated in FIG. 8, in the present embodiment, the waveform data fields 1820 and 1870 of the multiple processes are arranged in different areas.

In the display screen 1800, an X-axis unit field 1801, a Y-axis unit field 1802, a monitor range left 1803, a monitor range right 1804, a trigger (Ch 1-5) field 1806, and an X-axis field 1805 of the first process (for example, "start filling") are indicated. These items are the same as those of the first embodiment, and, therefore, descriptions thereof are omitted.

Five channel fields (a 1st channel field 1811 to a 5th channel field 1815) for the first process (for example, "start filling"), a waveform data field 1820, and a selected range display field 1830 are indicated.

The five channel fields (the 1st channel field 1811 to the 5th channel field 1815) are respectively the same as the channel fields (the 1st channel field 1411 to the 5th channel field 1415) illustrated in FIG. 4 of the first embodiment, and, therefore, descriptions thereof are omitted.

Waveform data 1821 to 1825 indicated in the waveform data field 1820 indicates changes in the setting information or changes in the actual values of each item indicated in the 1st channel field 1811 to the 5th channel field 1815.

In the output part 713, a left slider 1826 and a right slider 1827 are displayed in the waveform data field 1820.

When the receiving part 712 receives an operation of sliding in the left or right direction from the touch panel 770, the output part 713 displays the left slider 1826 moved to the right or left direction in the waveform data field 1820. The numerical value displayed in the monitor range left 1803 changes according to the numerical value pointed by the left slider 1826 that has moved.

When the receiving part 712 receives the operation of sliding in the left or right direction from the touch panel 770, the output part 713 displays the right slider 1827 moved to the right or left direction in the waveform data field 1820. The numerical value displayed in the monitor range right 1804 changes according to the numerical value pointed by the right slider 1827 that has moved.

The selected range display field 1830 indicates a list of the statistical values, the starting value, the ending value, etc., for each item set in each channel field within the range set by the left slider 1826 and the right slider 1827.

In the display screen 1800, an X-axis unit field 1851, a Y-axis unit field 1852, a monitor range left 1853, a monitor range right 1854, a trigger (Ch 6-10) field 1856, and a X-axis field 1855 of a second process (for example, "start metering") are indicated. These items are the same as those of the first embodiment, and, therefore, descriptions thereof are omitted.

Five channel fields (a 6th channel field 1861 to a 10th channel field 1865) for the second process (for example, "start metering"), a waveform data field 1870, and a selected range display field 1880 are indicated.

The five channel fields (the 6th channel field 1861 to the 10th channel field 1865) are respectively the same as the channel fields (the 6th channel field 1511 to the 10th channel field 1515) illustrated in FIG. 5 of the first embodiment, and, therefore, descriptions thereof are omitted.

Waveform data 1871 to 1875 indicated in the waveform data field 1870 indicates changes in the setting information or changes in the actual values of each item indicated in the 6th channel field 1861 to the 10th channel field 1865.

In the output part 713, a left slider 1876 and a right slider 1877 are displayed in the waveform data field 1870.

When the receiving part 712 receives the operation of sliding in the left or right direction from the touch panel 770, the output part 713 displays the left slider 1876 moved to the right or left direction in the waveform data field 1870. The numerical value displayed in the monitor range left 1853 changes according to the numerical value pointed by the left slider 1876 that has moved.

When the receiving part 712 receives the operation of sliding in the left or right direction from the touch panel 770, the output part 713 displays the right slider 1877 moved to the right or left direction in the waveform data field 1870. The numerical value displayed in the monitor range right 1854 changes according to the numerical value pointed by the right slider 1877 that has moved.

The selected range display field 1880 indicates a list of the statistical values, the starting value, the ending value, etc., for each item set in each channel field within the range set by the left slider 1876 and the right slider 1877.

In the present embodiment, a range can be set for each of the waveform data field 1820 of the first process (for example, "start filling") and the waveform data field 1870 of the second process (for example, "start metering"). This enables the user to specify the range while confirming the related processes with each other, thus reducing the operational load.

For example, the user can recognize the correspondence between back pressure at the time of metering and pressure at the time of filling, by confirming the statistical value of "back pressure detection" measured at the time of "start filling" while referring to the integral value of "back pressure detection" whose range is specified at "start metering".

Further, multiple waveform data fields may be displayed for a single process. In this case, multiple ranges (For example, 0 to 2 seconds, and 0 to 5 seconds) can be specified for a single process. This makes it possible to display statistical values and the like under various conditions, thereby improving quality control.

The output part 713 of the control device 700 according to the above described embodiment outputs a display screen including a selected range display field in which setting information and statistical values of each item are indicated in the range specified by the left and right sliders. The information indicated in the selected range display field can also be stored as log information.

In the control device 700 according to the above embodiment, the user can set the range while referring to the waveform data displayed in the waveform data field, by using the left and right sliders of the waveform data field and the like, and, therefore, the operation of setting the range to be monitored desired by the user can be facilitated. The control device 700 displays the information of the set range in the selected range display field, and, therefore, the user using the control device 700 can appropriately identify the situation of the range, and more detailed quality control of the molding product can be implemented. The control device 700 can improve the reliability of the molding product by preventing the variation in the quality of the molding product by implementing detailed quality control.

The control device 700 according to the above described embodiment receives operations on the left slider 1426 and the right slider 1427 via the touch panel 770. In the control device 700, because the touch panel 770 receives operations with respect to the left slider 1426 and the right slider 1427 displayed on the touch panel 770, it is easier for the user to intuitively specify the range of statistical values than the case of directly inputting numerical values into a text field, and thus the operational load can be reduced.

In the control device 700 according to the above described embodiment, the memory utilization can be reduced, by specifying the range to be monitored, to prevent the display of information such as setting information and statistical values outside the specified range, when displaying the setting information and statistical values in the specified range in the selected range display field. Furthermore, the control device 700 can store information included in the specified monitor range as log information, while not storing information outside the monitor range, thereby preventing the storage of unnecessary information, so that the utilization of the information storage part 711 can be reduced.

The above described embodiment describes an example of using the touch panel 770 as a display input device, which is an integrated device of a display device and an input device, and which can receive an operation in the screen area displayed by the display device, and which is connected to the injection molding machine 10. However, the above embodiment does not limit the display input device to the touch panel 770, as long as the display input device is connected to the injection molding machine 10 and can receive the operation in the screen area. The display input device may be, for example, a smartphone or tablet terminal that can be connected to the injection molding machine 10 by wireless communication.

Furthermore, the screen area where the display input device receives an operation is not limited to the display screen of the touch panel 770 described above. The display input device will suffice as long as the device can receive an operation on a displayed screen or the like, and may receive an operation in an area (an example of a screen area) displaying visual information that is virtually expanded by using XR, such as VR (Virtual Reality), AR (Augmented Reality), MR (Mixed Reality), or the like.

According to one aspect of the present invention, detailed quality control can be implemented, because it becomes easy to appropriately identify the situation of a specified range.

As described above, an embodiment of the injection molding machine according to the present invention has been described, but the present invention is not limited to the above-mentioned embodiment. Various changes, modifications, substitutions, additions, deletions, and combinations are possible within the scope of the claims. These modifications, etc., are also included in the technical scope of the present invention.

What is claimed is:

1. A control device of an injection molding machine, the control device comprising:

a processor configured to:

output a display screen displaying:

waveform information indicating a change of at least one of setting information indicating a setting of a selected one of a plurality of processes of injection molding or an actual value according to the selected one of the plurality of the processes, and a plurality of pieces of instruction information to set a range of the waveform information or statistical values displayed in a selected range display field, said display screen being output to a display input device in which a display device and an input device are integrated, said display screen including a first setting part to set a starting value that defines a starting value at which the range of the waveform information or the statistical values starts, and a second setting part that defines an ending value at which the range of the waveform information or the statistical values ends, said display input device being configured to receive an operation in a screen area displayed by the display input device, said display input device being connected to the injection molding machine; and receive, from the display input device, an operation with respect to at least one of the plurality of pieces of instruction information displayed on the display screen, wherein the plurality of pieces of instruction information includes the starting value and the ending value that define the range of the waveform information or the statistical values, wherein of the starting value for each of the plurality of the processes is set, independently of the ending value for each of the plurality of the processes, based on the operation that is performed to the first setting part, and the ending value for each of the plurality of the process is set, independently of the starting value for each of the plurality of the processes, based on the operation that is performed to the second setting part, and wherein the processor is further configured to:

receive, after start displaying the waveform information or the statistical values in the range that is set based on the plurality of pieces of instruction information, another plurality of pieces of instruction information including another starting value and another ending value that define another range of the waveform information or the statistical values, and output the display screen displaying the waveform information or the statistical values based on the another range, each of the another starting value and the another ending value being individually set based on operation with respect to each of the another starting value and the another ending value, the another range of the waveform information or the statistical values being different from the range of the waveform information or the statistical values.

2. The control device of the injection molding machine according to claim 1, wherein the processor further outputs, to the display input device, information indicating a characteristic of each item, the information including the setting information which represents the setting of the process and the actual value obtained according to the process, included in the range set by the plurality of pieces of instruction information.

3. The control device of the injection molding machine according to claim 1, wherein the processor further updates information indicating a characteristic of each item, the information including the setting information which represents the setting of the process and the actual value obtained according to the process, that is output to the display input device, every time a position of the plurality of pieces of instruction information is changed.

4. The control device of the injection molding machine according to claim 1, wherein the processor outputs, to the display input device, a screen in which the waveform information is indicated in different areas for each of a plurality of the processes.

5. The control device of the injection molding machine according to claim 1, wherein each of the range of the waveform information and the another range of the waveform information is a range to be monitored.

6. The control device of the injection molding machine according to claim 1, wherein the processor is further configured to:

receive the another plurality of pieces of instruction information to set another range of the waveform information or the statistical values while continuing to updating the waveform information or the statistical values in the range.

7. The control device of the injection molding machine according to claim 1, wherein an entirety of the another range of the waveform information or the statistical values is within the range that is set based on the plurality of pieces of instruction information, and wherein the processor is further configured to update the waveform information that is displayed on the display screen based on the another range of the waveform information or the statistical values.

8. An injection molding machine comprising:

a display input device;

a processor configured to:

output, to the display input device, a display screen displaying:

waveform information indicating a change of at least one of setting information indicating a setting of a selected one of a plurality of processes of the injection molding machine or an actual value according to the selected one of the plurality of the processes, a plurality of pieces of instruction information to set a range of the waveform information or statistical values displayed in a selected range display field; and a first setting part to set a starting value that defines a starting value at which the range of the waveform information or the statistical values starts, and a second setting part that defines an ending value at which the range of the waveform information or the statistical values ends, and receive, from the display input device, an operation with respect to at least one of the plurality of pieces of instruction information displayed on the display screen, wherein the plurality of pieces of instruction information includes a starting value and an ending value that define the first range of the waveform information or the statistical values, wherein the starting value for each of the plurality of the processes is set, independently of the ending value for each of the plurality of the processes, based on the operation that is performed to the first setting part, and the ending value for each of the plurality of the process is set, independently of the starting value for each of the plurality of the processes, based on the operation that is performed to the second setting part, and wherein the processor is further configured to:

receive, after start displaying the waveform information or the statistical values in the range that is set based on the plurality of pieces of instruction information, another plurality of pieces of instruction information including another starting value and another ending value that define another range of the waveform information or the statistical values, and output the display screen displaying the waveform information or the statistical values based on the another range, each of the another starting value and the another ending value being individually set based on operation with respect to each of the another starting value and the another ending value, the another range of the waveform information or the statistical values being different from the range of the waveform information or the statistical values.

9. A non-transitory computer-readable recording medium storing a program that causes a computer to execute a process, the process comprising:

outputting a display screen displaying:

waveform information indicating a change of at least one of setting information indicating a setting of a selected one of a plurality of processes of an injection molding process or an actual value according to the selected one of the plurality of the processes, a plurality of pieces of instruction information to set a range of the waveform information or statistical values displayed in a selected range display field, said display screen being output to a display input device in which a display device and an input device are integrated, said display input device being configured to receive an operation in a screen area displayed by the display input device, said display input device being connected to the injection molding machine; and a first setting part to set a starting value that defines a starting value at which the range of the waveform information or the statistical values starts, and a second setting part that defines an ending value at which the range of the waveform information or the statistical values ends, and receiving, from the display input device, an operation with respect to at least one of the plurality of pieces of instruction information displayed on the display screen, wherein the plurality of pieces of instruction information includes a starting value and an ending value that define the range of the waveform information or the statistical values, wherein the starting value for each of the plurality of the processes is set, independently of the ending value for each of the plurality of the processes, based on the operation that is performed to the first setting part, and the ending value for each of the plurality of the process is set, independently of the starting value for each of the plurality of the processes, based on the operation that is performed to the second setting part, and wherein the process further comprises:

receiving, after start displaying the waveform information or the statistical values in the range that is set based on the plurality of pieces of instruction information, another plurality of pieces of instruction information including another starting value and another ending value that define another range of the waveform information or the statistical values, and outputting the display screen displaying the waveform information or the statistical values based on the another range, each of the another starting value and the another ending value being individually set based on operation with respect to each of the another starting value and the another ending value, the another range of the waveform information or the statistical values being different from the range of the waveform information or the statistical values.

10. A control device of an injection molding machine, the control device comprising:

a processor configured to:

output a display screen displaying:

waveform information corresponding to a progress of a selected one of a plurality of processes of injection molding and indicating a change of at least one of setting information indicating a setting of the selected one of the plurality of processes of the injection molding or an actual value according to the selected process, a plurality of pieces of instruction information to set a range of the waveform information corresponding to the progress or statistical values corresponding to the progress displayed in a selected range display field, said display screen being output to a display input device in which a display device and an input device are integrated, said display input device being configured to receive an operation in a screen area displayed by the display input device, said display input device being connected to the injection molding machine; and a first setting part to set a starting value that defines a starting value at which the range of the waveform information or the statistical values starts, and a second setting part that defines an ending value at which the range of the waveform information or the statistical values ends, and receive, from the display input device, an operation with respect to at least one of the plurality of pieces of instruction information displayed on the display screen, said plurality of pieces of instruction information including a starting value and an ending value that define the range of the waveform information or the statistical values, the starting value for each of the plurality of the processes being set, independently of the ending value for each of the plurality of the processes, based on the operation that is performed to the first setting part, and the ending value for each of the plurality of the process is set, independently of the starting value for each of the plurality of the processes, based on the operation that is performed to the second setting part, and receive, after start displaying the waveform information or the statistical values in the range that is set based on the plurality of pieces of instruction information, another plurality of pieces of instruction information including another starting value and another ending value that define another range of the waveform information or the statistical values, and output the display screen displaying the waveform information or the statistical values based on the another range, each of the another starting value and the another ending value being individually set based on the operation with respect to each of the another starting value and the another ending value, the another range of the waveform information or the statistical values being different from the range of the waveform information or the statistical values.

\* \* \* \* \*